(12) United States Patent
Moon et al.

(10) Patent No.: US 10,386,635 B2
(45) Date of Patent: Aug. 20, 2019

(54) ELECTRONIC DEVICE AND METHOD FOR CONTROLLING THE SAME

(71) Applicant: LG ELECTRONICS INC., Seoul (KR)

(72) Inventors: Beomsuk Moon, Seoul (KR); Yusol Ha, Seoul (KR); Minhyeok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/877,313

(22) Filed: Jan. 22, 2018

(65) Prior Publication Data

US 2018/0246326 A1 Aug. 30, 2018

(30) Foreign Application Priority Data

Feb. 27, 2017 (KR) .................. 10-2017-0025689
Mar. 3, 2017 (KR) .................. 10-2017-0027766

(51) Int. Cl.
*G02B 27/01* (2006.01)
*G06F 3/01* (2006.01)
(Continued)

(52) U.S. Cl.
CPC .......... *G02B 27/017* (2013.01); *A63F 13/211* (2014.09); *A63F 13/212* (2014.09);
(Continued)

(58) Field of Classification Search
CPC ...... G06F 3/014; G06F 3/012; G06F 3/04815; G06F 1/163; G02B 27/017
See application file for complete search history.

(56) References Cited

U.S. PATENT DOCUMENTS 8,684,821 B2 * 4/2014 Kim .................. A63F 13/428
                                                  463/24
9,665,170 B1 * 5/2017 Ross .................. G06F 3/011
(Continued)

FOREIGN PATENT DOCUMENTS

EP    1136105 A1 * 9/2001 ............. A63F 13/10
WO    2013094778      6/2013
WO    2016195147     12/2016

OTHER PUBLICATIONS

European Patent Office Application Serial No. 17204041.2, Search Report dated Jun. 18, 2018, 11 pages.

*Primary Examiner* — William L Bashore
*Assistant Examiner* — Gregory A Distefano
(74) *Attorney, Agent, or Firm* — Lee, Hong, Degerman, Kang & Waimey

(57) ABSTRACT

An electronic device and an operating method thereof are disclosed. The electronic device includes a main body, a display configured to display a 3D screen corresponding to virtual reality content, a controller, when an event occurs from at least one application while the 3D screen is displayed, configured to output notification information notifying an event occurrence in correspondence to the 3D screen, and a sensor configured to sense a degree of movement of a user when the notification information is output. At this time, when the degree of movement of the user sensed during the event satisfies a predetermined condition, the 3D screen is replaced with dummy content related to the 3D screen; and the dummy content disappears when the event ends.

15 Claims, 19 Drawing Sheets

(51) Int. Cl.
   *G06F 3/0481*      (2013.01)
   *A63F 13/25*       (2014.01)
   *A63F 13/211*      (2014.01)
   *A63F 13/213*      (2014.01)
   *A63F 13/5255*     (2014.01)
   *A63F 13/212*      (2014.01)
   *A63F 13/493*      (2014.01)
   *G06F 1/16*        (2006.01)

(52) U.S. Cl.
   CPC ............ *A63F 13/213* (2014.09); *A63F 13/25* (2014.09); *A63F 13/493* (2014.09); *A63F 13/5255* (2014.09); *G02B 27/0172* (2013.01); *G06F 1/163* (2013.01); *G06F 3/011* (2013.01); *G06F 3/012* (2013.01); *G06F 3/014* (2013.01); *G06F 3/017* (2013.01); *G06F 3/04815* (2013.01); *G02B 2027/014* (2013.01); *G02B 2027/0138* (2013.01)

(56) References Cited

U.S. PATENT DOCUMENTS

| | | | |
|---|---|---|---|
| 2008/0004095 A1* | 1/2008 | Hayasaka | A63F 13/10 463/1 |
| 2013/0147686 A1* | 6/2013 | Clavin | G06F 3/013 345/8 |
| 2014/0364197 A1* | 12/2014 | Osman | A63F 13/00 463/24 |
| 2016/0042566 A1 | 2/2016 | Mao | |

* cited by examiner

FIG. 7
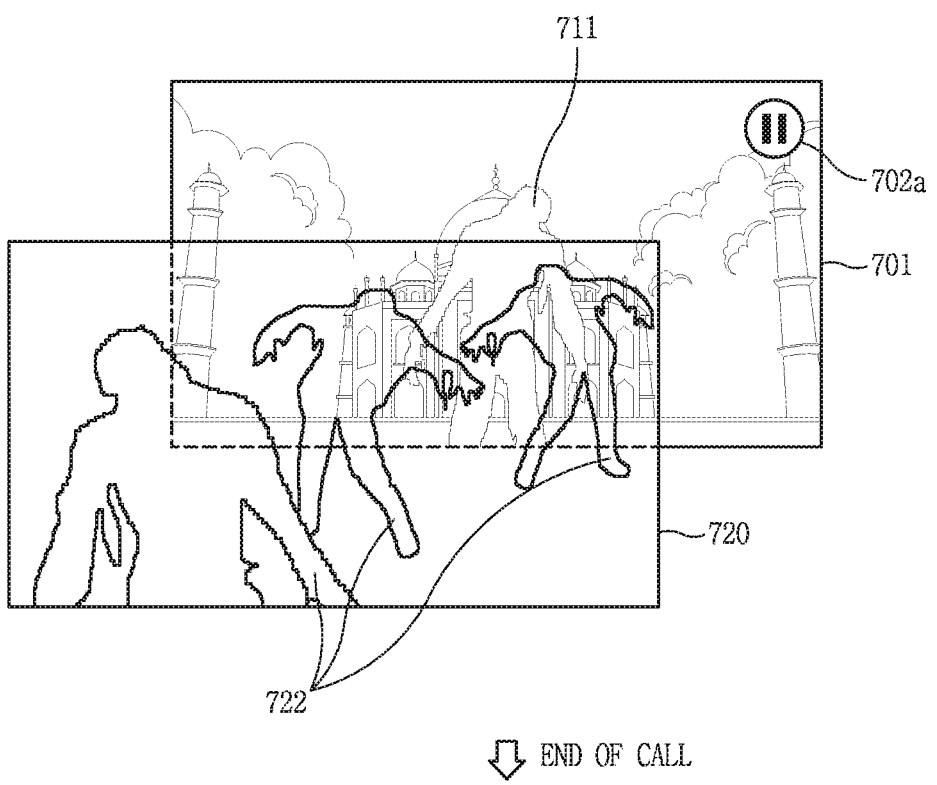
⇩ END OF CALL
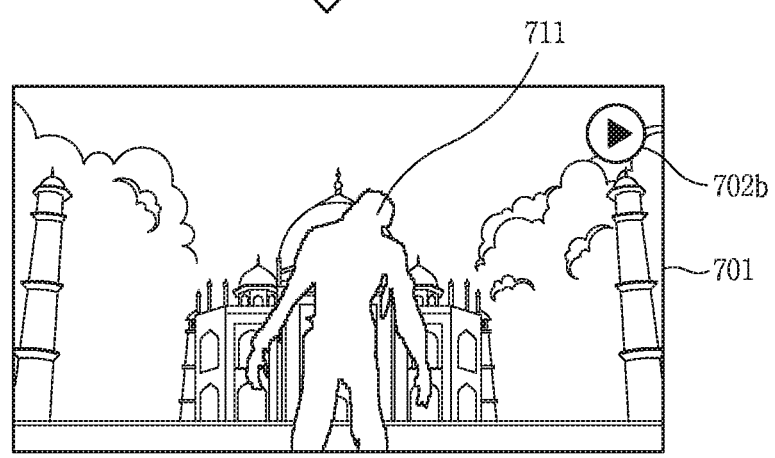

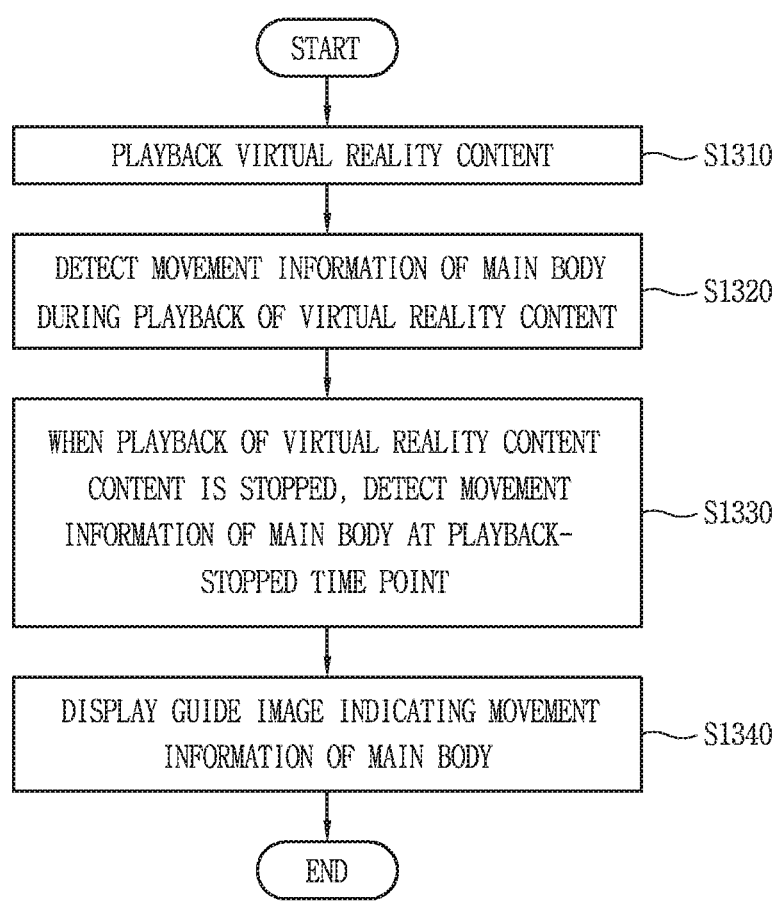

FIG. 14A
(a)
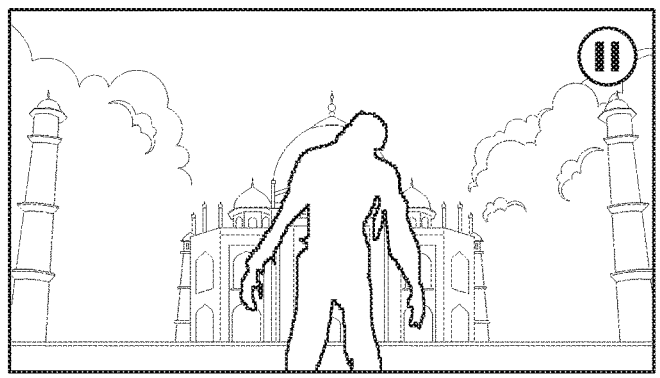
[PLAYING BACK]
(b)
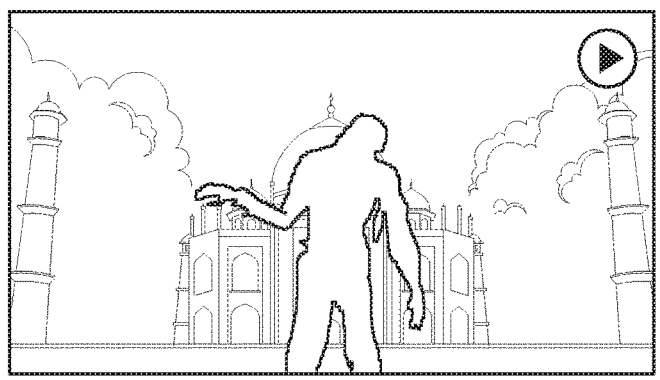
[PLAYBACK STOP]
1410
(c)
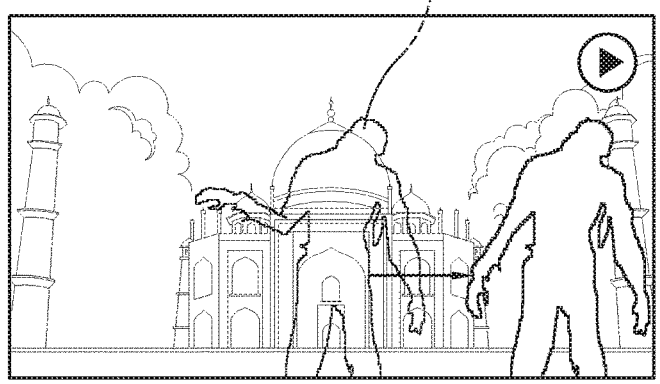
[PLAYBACK STOP]

FIG. 19
(a) 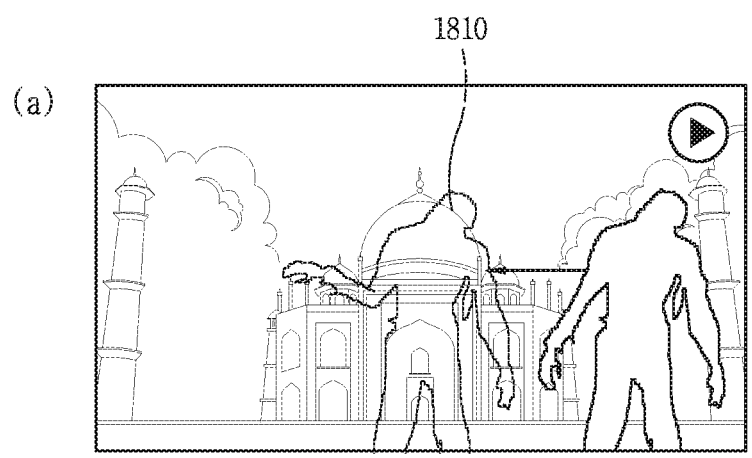
⇩ PLAYBACK COMMAND
(b) 

ELECTRONIC DEVICE AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2017-0025689, filed on Feb. 27, 2017, and Korean Application No. 10-2017-0027766, filed on Mar. 3, 2017, the contents of which are all hereby incorporated by reference herein in their entirety.

BACKGROUND OF THE INVENTION

1. Field of the Invention

The present invention relates to an electronic device capable of providing virtual reality content.

2. Background of the Invention

A Head Mounted Display (HMD)-type electronic device refers to a display device that is worn on the head of a user and can present an image directly in front of the user's eyes. Such an electronic device may allow a user to enjoy image content with a larger image than a TV or a screen, and especially, may display a virtual space screen so that a user can enjoy a virtual space experience.

Methods of using such an electronic device in linkage with another device such as a smart phone, a laptop computer, a navigation device, a slate PC, a tablet PC, an ultrabook, a wearable device have been actively studied.

At this time, when a specific event occurs using an electronic device during a virtual space experience, a user has to disconnect another linked device from the electronic device in order for event confirmation. Or, even when the event can be confirmed with the electronic device worn, there are a lot of entering steps for confirming the event, such as entering a dashboard after completing the virtual space experience, and the steps are complex.

Accordingly, the immersion of the virtual space experience is interfered and when a user returns to the virtual space experience again after the confirmation of the event, there is a problem that motion sickness is caused by the difference from the actual experience of the user.

SUMMARY OF THE INVENTION

Therefore, an aspect of the detailed description is to provide an electronic device for preventing a user from experiencing motion sickness while a user checks an event with the electronic device worn and when a user returns to viewing content after checking an event.

Another aspect of the detailed description is to provide an electronic device for helping a user, who wears the electronic device, to adapt to a content viewing environment when the user returns to viewing content after confirming an event.

Another aspect of the detailed description is to provide an electronic device for reducing a gap between a virtual reality world and a real world when a user, who wears the electronic device, moves between a virtual reality world and a real world.

To achieve these and other advantages and in accordance with the purpose of this specification, as embodied and broadly described herein, there is provided an electronic device including a main body, a display unit configured to display a 3D screen corresponding to virtual reality content, a control unit, when an event occurs from at least one application while the 3D screen is displayed, configured to output notification information notifying an event occurrence in correspondence to the 3D screen, and a sensing unit configured to detect a movement degree of a user when the notification information is outputted. At this time, when the movement degree of the user detected during the event satisfies a predetermined condition, the control unit replaces the 3D screen with dummy content related to the 3D screen; and the dummy content disappear when the event ends.

When the event ends after the playback of the dummy content, the control unit may play back the 3D screen from a second time point ahead of (i.e. earlier in time than) a playback-stopped first time point. An interval between the first time point and the second time point may be proportional to a playback time of the dummy content.

The control unit may obtain movement information of a user at a time point that the playback of the 3D screen is stopped and when the 3D screen is played back from the second time point according to the end of the event, and provide a guide image indicating the obtained movement information on the 3D screen. The guide image may indicate at least one of a location and posture of a user, and a location and posture of the main body in virtual reality content corresponding to the 3D screen.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 7 is a conceptual diagram showing an operation that a 3D screen is played back again in an electronic device according to an embodiment of the present invention;

FIG. 13 is a flowchart illustrating a method of providing movement information of a user on playback-stopped virtual reality content in an electronic device according to an embodiment of the present invention;

FIGS. 18 and 19 are conceptual diagrams showing a method of playing back playback-stopped virtual reality content again in an electronic device according to an embodiment of the present invention.

DETAILED DESCRIPTION OF THE INVENTION

Figure 1:
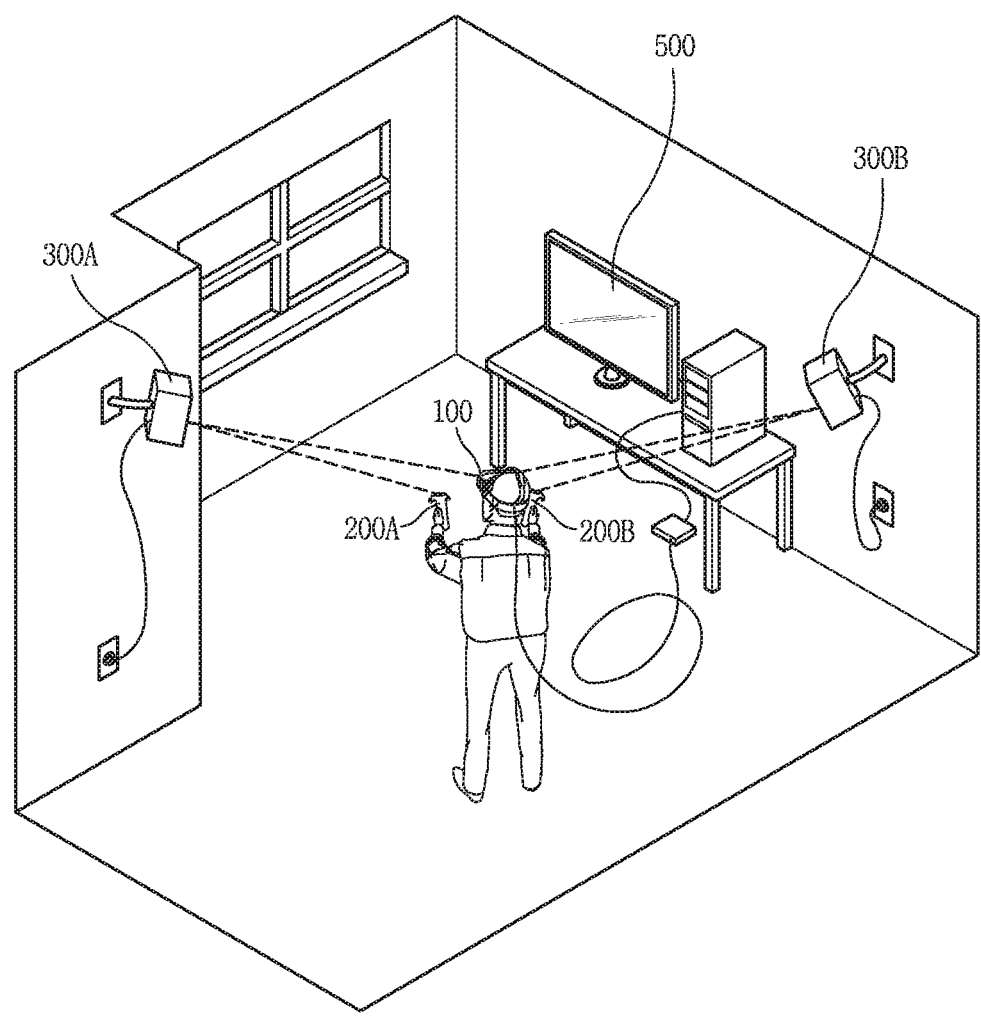
FIG. 1 is a conceptual diagram showing a usage example of an electronic device related to the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

An electronic device presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of electronic devices. However, such teachings apply equally to other types of electronic devices, such as those types noted above. In addition, these teachings may also be applied to stationary terminals such as digital TV, desktop computers, and the like.

Furthermore, the term "user" used in the embodiments described below may refer to a person using an electronic device or a device using an electronic device (e.g., a robot with artificial intelligence). In addition, the embodiments described below describe a technique related to operations of an electronic device when an event occurs during a virtual experience.

Figure 2:
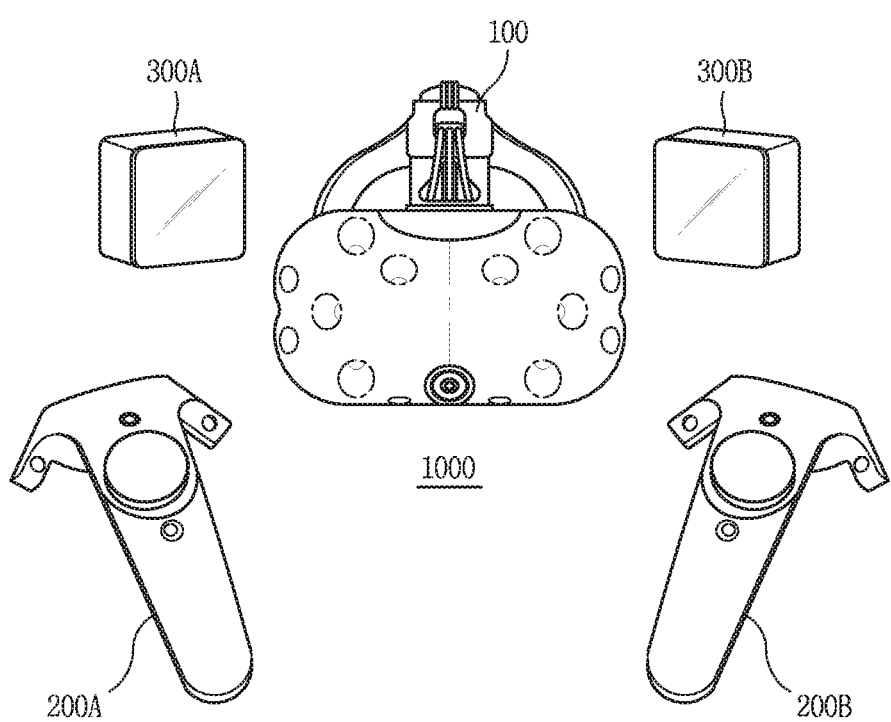
FIG. 2 is an exemplary conceptual diagram showing configurations of an electronic device related to the present invention and a device used in linkage with the electronic device.

FIG. 1 is a conceptual diagram showing an example of use of an electronic device related to the present invention, and FIG. 2 is an exemplary conceptual diagram 1000 showing a configuration of an electronic device related to the present invention and peripheral devices used in linkage with the electronic device.

Referring to FIG. 1, in relation to an electronic device 100 according to an embodiment of the present invention, a lighthouse system may detect the position of the electronic device 100 by applying a positional tracking technique. Thus, it helps the electronic device 100 to track the user's 360 degree motion. Here, the lighthouse system may be implemented by installing a plurality of lighthouse devices 300A and 300B in a closed specific space, as shown in FIG. 1. Further, the plurality of lighthouse devices 300A and 300B may be installed at positions where a recognizable space range can be maximized, for example, at positions facing each other in a diagonal direction.

The electronic device 100 receives light emitted from an LED or laser emitters included in the plurality of lighthouse devices 300A and 300B, and accurately determines the position of the electronic device 100 in a closed specific space based on the correlation between the position at which the corresponding light is received and the time. To this end, the lighthouse devices 300A and 300B each may include an IR lamp and a two-axis motor, and through this, exchanges signals with the electronic device 100.

In addition, the electronic device 100 may perform wired/wireless communication with an external device (e.g., a PC). For this, although it is shown in FIG. 1 that the electronic device 100 and an external device 500 are connected to each other using a wire cable, the present invention is not limited thereto, and for example, a wireless connection using a wireless module kit is also possible. The electronic device 100 may receive a virtual space image stored in the connected external device 500 from the external device 500 and display it to a user.

In addition, controllers 200A and 200B for controlling operations related to the virtual space image displayed through the electronic device 100 may be provided as another peripheral device of the electronic device 100. As shown in FIG. 2, the controllers 200A and 200B may be provided in a form that a user can grip on both hands easily, and a touchpad (or a trackpad), a button, and like for receiving a user input may be provided at the outer surfaces of the controllers 200A and 200B.

In addition, the electronic device 100 may track the motion of a user and perform interaction with the electronic device 100 through various sensors provided in the controllers 200A and 200B, for example, an IR sensor or a motion tracking sensor. In addition, the controllers 200A and 200B may be linked with an actual environment image confirmed through a camera provided in the electronic device 100. Accordingly, a user may immediately check an external environment through operations of the controllers 200A and 200B without taking off the electronic device 100 even during a virtual space experience.

Figure 3A:
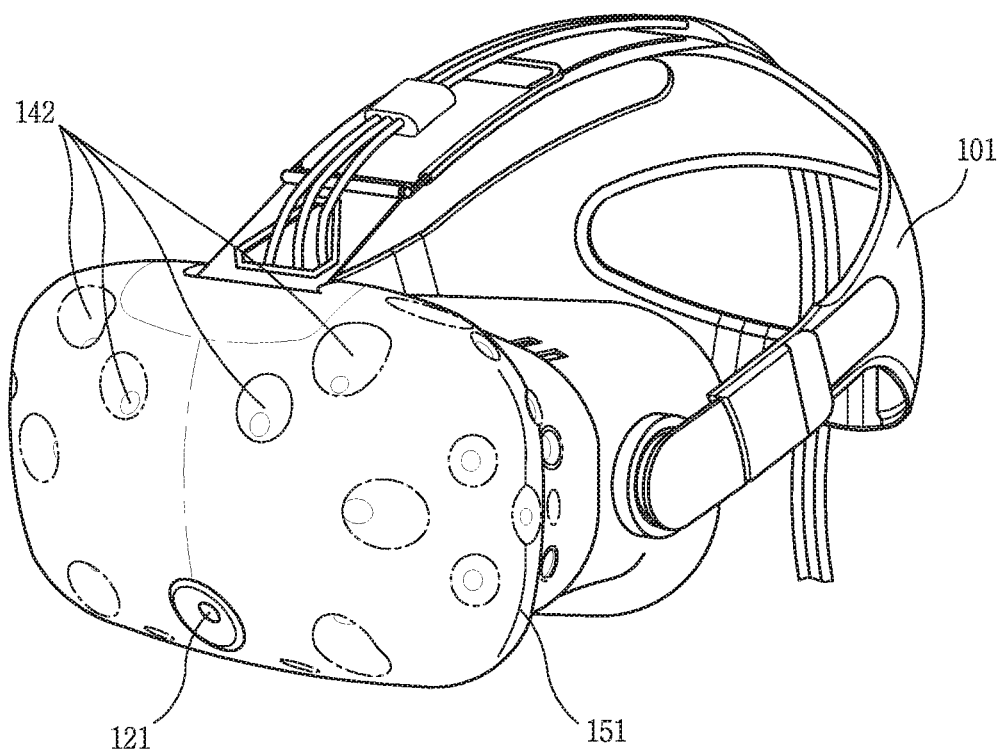
FIG. 3A is a conceptual view of an electronic device related to the present invention as seen in one direction.
Figure 3B:
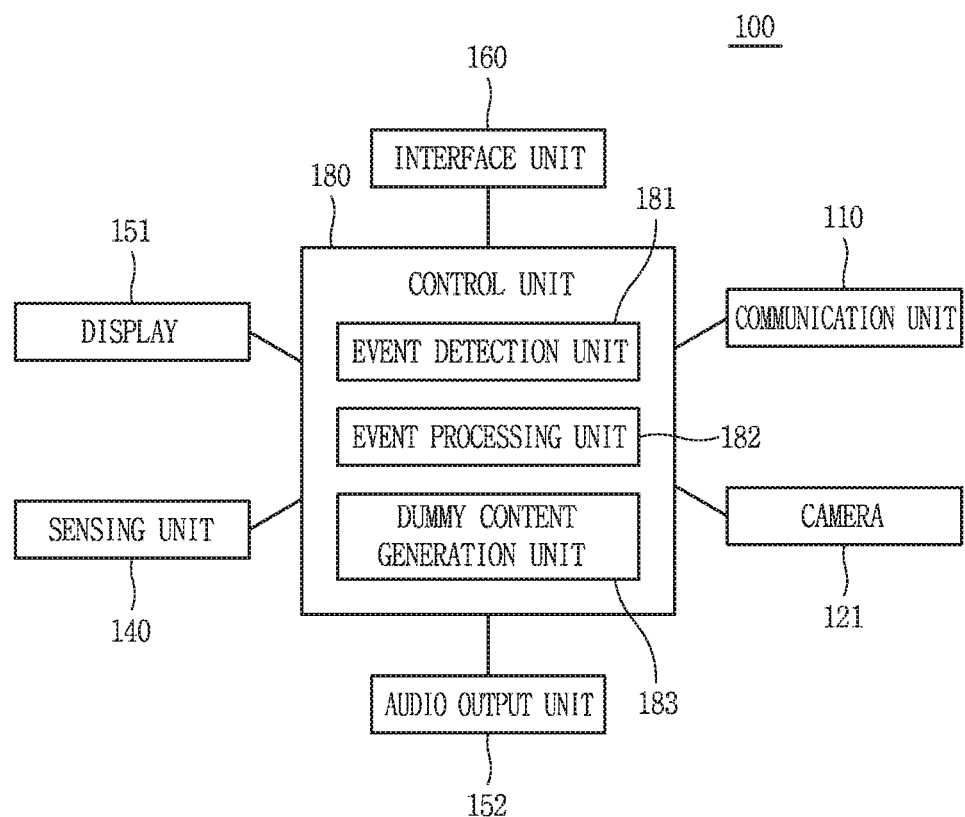
FIG. 3B is a block diagram illustrating an exemplary configuration of an electronic device related to the present invention.

FIG. 3A is a conceptual view of an electronic device related to the present invention as seen in one direction, and FIG. 3B is a block diagram illustrating an exemplary configuration of an electronic device related to the present invention.

As shown in FIG. 3A, a wearing part 101 of an electronic device 100 may be made of a flexible material, for example, a band of rubber or the like, which can be wrapped around a wearer's head when worn. At this time, the band may be made to adjust the length along the circumference of the head when worn on the user's head.

A display unit 151 on which a virtual space image is displayed and motion sensors 142 for tracking the motion of a user may be provided at the front of the electronic device 100, that is, another frame different from the wearing part 101. In addition, a front camera 121 may be further provided so that the external environment can be checked even when the electronic device 100 is worn.

The electronic device 100 related to the present invention may be configured to include at least one of components described below with reference to FIG. 3B.

Referring to FIG. 3B, the electronic device 100 may include a communication unit 110, a camera 121, an audio output unit 152, a sensing unit 140, a display unit 151, an interface unit 160, and a control unit 180. In addition, the control unit 180 may include an event detection unit 181, an event processing unit 182, and a dummy content generation unit 183.

The interface unit 160 connects the electronic device 100 and the external device 500 by wire. Accordingly, the electronic device 100 may receive virtual reality content from the external device 500, and perform interaction by exchanging various input signals, sensing signals, and data. Also, the electronic device 100 may be supplied with power from the external device 500 through the interface unit 160. However, as described above, it is apparent that the electronic device 100 and the external device 500 can be wirelessly connected through a wireless module kit or the like.

For example, the interface unit 160 may include a wired/wireless headset port, an external charger port, a wired/wireless data port, a memory card port, a port connecting a device equipped with an identification module, an audio I/O port, a video I/O port, and an earphone port.

The display unit 151 is provided at a position corresponding to the both eyes of a user. The virtual reality content outputted to the display unit 151 may be stored in the electronic device 100 itself or stored in the external device 500.

For example, in the case of a virtual space image stored in the electronic device 100, the electronic device 100 performs image processing and rendering processing for processing the image of the virtual space, the image information generated as a result of the image processing and rendering processing may be outputted through the display unit 151. On the other hand, in the case of a virtual space image stored in the external device 500, the external device 500 may perform image processing and rendering processing, and may transmit the image information generated as a result thereof to the electronic device 100. Then, the electronic device 100 may output the 3D image information received from the external device 500 through the display unit 151.

In addition, the electronic device 100 may further include at least one of an input unit, an audio output unit, a memory, and a power supply unit. In implementing the electronic device 100, the components shown in FIG. 3B are not necessary, so that the electronic device 100 described in this specification may include components less or more than the components listed above.

The camera 121 may be disposed on one side of the frame part of the electronic device 100, for example, on the front. The camera 121 may be provided to capture (receive, or input) a forward video, and in particular, may capture a scene that a user views. Although one camera 121 is provided here, the present invention is not limited thereto. The camera 121 may be provided in plurality to obtain a three-dimensional image.

The sensing unit 140 may include at least one of a proximity sensor, an illumination sensor, a touch sensor, an acceleration sensor, a magnetic sensor, a G-sensor, a gyroscope sensor, an RGB sensor, an infrared sensor, an ultrasonic sensor, an optical sensor (e.g., the camera 221), a microphone, a battery gauge, an environmental sensor (e.g., a barometer, a hygrometer, a thermometer, a radiation sensor, a thermal sensor, a gas sensor, etc.), and a chemical sensor (e.g., an electronic nose, a healthcare sensor, a biometric sensor, etc.).

For example, the control unit 180 may detect a movement of the electronic device 100 or a user by using a gyroscope sensor, a gravity sensor, a motion sensor, and the like included in the sensing unit 140. Also, it is possible to detect a movement of a user through sensors provided in the controllers 200A and 200B that operate in linkage with the electronic device 100.

As another example, the control unit 180 may detect an object approaching the electronic device 100 or a user by using a proximity sensor, an illumination sensor, a magnetic sensor, an infrared sensor, an ultrasonic sensor, and an optical sensor.

The electronic device 100 may include a user input (not shown) operated to receive a control command. The user input unit may adopt any method when it is a tactile manner that a user manipulates touch and push with tactile feeling. Although not shown in this drawing, the wearing part 101 or the frame part may be provided with a push and touch input-type user input unit.

Additionally, the electronic device 100 may be provide with a microphone (not shown) for receiving sound and processing it to electrical voice data and a sound output unit 452 for outputting sound. The sound output unit may be configured to deliver sound through a general sound output method or a bone conduction method. When the sound output unit is implemented with a bone conduction method and a user wears the electronic device 100, the sound output unit closely contacts the head portion and delivers sound by vibrating the skull.

The display unit 151 is mounted on the frame part and serves to output screen information (e.g., image, video, etc.) in front of the user's eyes. When a user wears the electronic device 100, in order to display screen information in front of the user's eyes, the display unit 151 may be disposed in correspondence to at least one of the left eye and the right eye. That is, the display unit 151 may be formed to cover at least one of the left and right eyes of a user (or to face at least one of the left and right eyes of a user).

For example, the display unit 151 of the electronic device 100 related to the present invention may be located on the inner surface of the frame part of the electronic device 100. Specifically, the display unit 151 may be disposed at a position facing the user's eyes when the user wears the electronic device 100 on the user's head.

In addition, the electronic device 100 may include a lens unit so that the user can see the screen information outputted from the display unit 151 formed inside the main body of the electronic device 100. That is, the electronic device 100 related to the present invention may be formed such that all the screen information (or light) outputted from the display unit 151 through the lens unit is transmitted through the eyeball (or a field of view) of a user.

For example, the lens unit may be arranged to correspond to at least one of the eyes of a user (i.e., the left eye and the right eye). In addition, the lens unit may be arranged to lie between the user's eyeball and the display unit 151 when the user wears the electronic device 100 on the head. In addition, since the viewing angle may vary according to the distance between the user's eyeball and the display unit 151, the position of the lens unit may be varied by user's control. Further, the lens unit may be formed through a concave lens, a convex lens, or a combination thereof.

Also, the display unit 151 may project an image to the user's eyes using a prism. Additionally, in order to allow a user to see the projected image and a general front view (i.e., a range that the user can see through the eyes) together, the prism may be transparent.

In such a way, an image outputted through the display unit 151 may be overlapped with a general view and displayed. The electronic device 100 may provide augmented reality (AR) superimposing a virtual image on a real image or a background and displaying it as one image by using characteristics of such a display.

That is, the display unit 151 may be formed to prevent external light from passing through in order to realize a virtual reality (VR), or to allow external light to pass through in order to realize an Augmented Reality (AR).

Further, although not shown in the drawing, another display that covers at least one of the left eye and the right eye may be detachably mounted on the frame part.

The communication unit 110 may include at least one wireless communication module that allows wireless communication between the electronic device 100 and a communication system, between the electronic device 100 and the external device 500, between the electronic device 100 and the control device of the electronic device 100, between the electronic device 100 and a camera installed outside to allow wireless communication, or between the electronic device 100 and an external server. Such a wireless communication module may include at least one of a broadcast reception module, a mobile communication module, a wireless Internet module, a short distance communication module, and a location information module.

In the embodiments of the present invention, the control unit 180 controls the playback-related operation of a virtual space image as a whole.

The event detection unit 181 may detect that an event occurs in at least one application while the virtual space image is being displayed. When an event occurs, the event processing unit 182 generates notification information indicating the event occurrence and outputs the generated notification information in correspondence to the virtual space image. Also, the event processing unit 182 may process the event occurrence as one of an event check, a no event response, or an event termination based on a user's response to the event occurrence. The dummy content generation unit 183 controls the playback-related operation of the dummy content related to the current virtual reality content when the movement of a user is slowed down after the event occurrence. The operation related to the generation of the dummy content will be described in detail below with reference to the drawings.

Figure 4A:
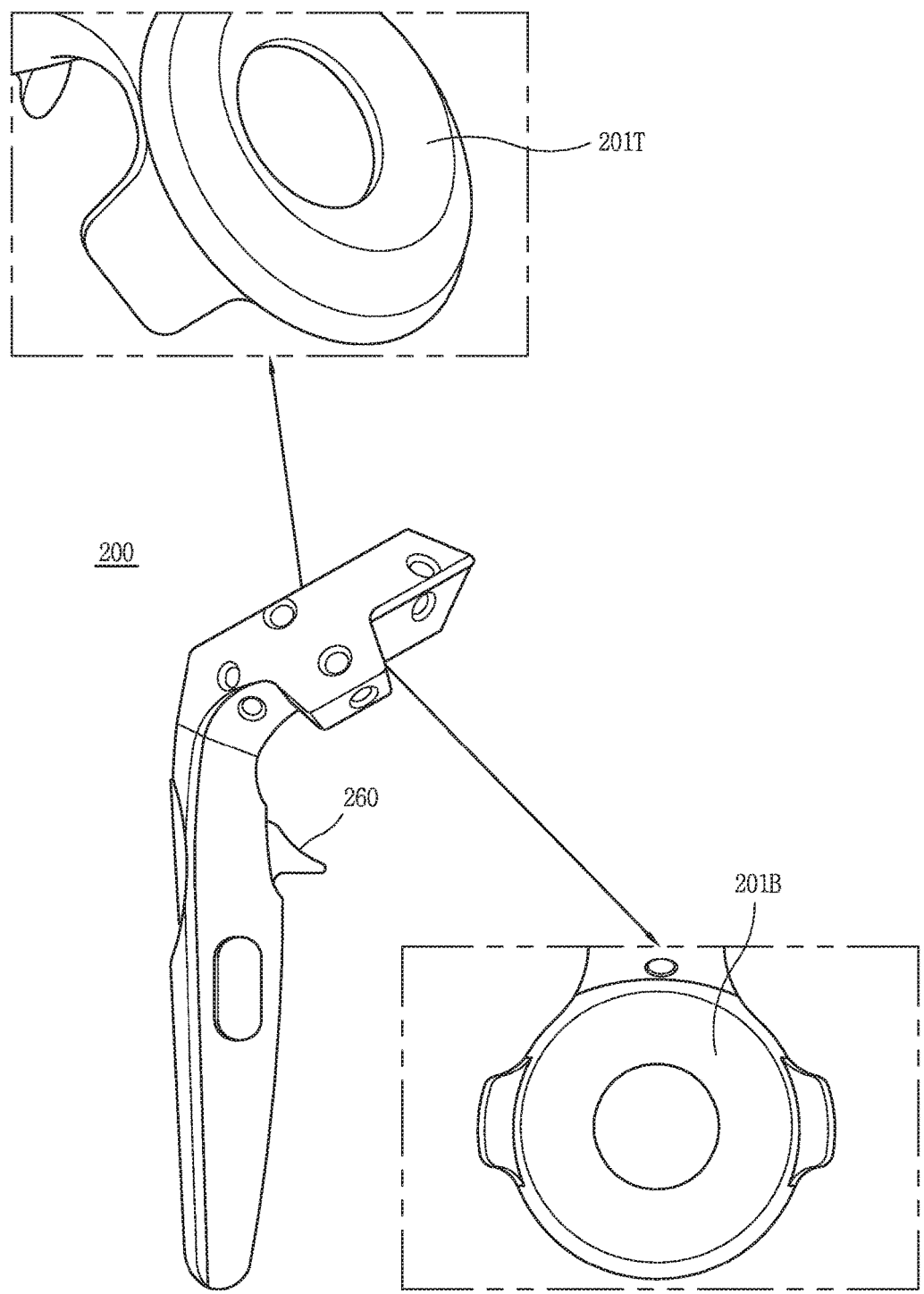
FIG. 4A is an exemplary conceptual diagram of a controller used in linkage with the electronic device of FIG. 3A.
Figure 4B:
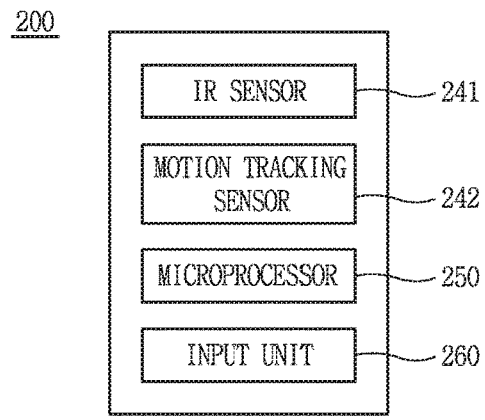
FIG. 4B is a block diagram illustrating an exemplary configuration of the controller of FIG. 4A.

FIG. 4A is an exemplary conceptual diagram of a controller used in linkage with the electronic device of FIG. 3A, and FIG. 4B is a block diagram illustrating an exemplary configuration of the controller of FIG. 4A.

The controller 200 shown in FIG. 4A may be used to control a screen outputted to the display unit 151 in linkage with the electronic device 100 of FIG. 3A, and as shown in the drawing, may include a grip part for gripping the controller 200 by a user, and a head part extending from the grip part and including various sensors and a microprocessor. As shown in the drawing, the grip part may be formed in a vertically elongated bar shape so that the user can easily grip it, and the head part may be formed in a ring shape.

Referring to FIG. 4B, the controller 200 may include an IR sensor 241, a motion tracking sensor 242, a microprocessor 250, and an input unit 260.

Referring to FIG. 4A again, for example, 11 IR sensors 241 may be provided on each of the outer surface 201T and the inner surface 201B of the head part of the controller 200 and two IR sensors 241 may be provided at the center between the outer surface 201T and the inner surface 201B. At this time, each IR sensor 241 may be covered with an infrared filter and protected from the external environment. In addition, the IR sensor 241 is used to receive light emitted from the lighthouse devices 300A and 300B and to track a user operation.

The motion tracking sensor 242 may include a three-axis acceleration sensor, a three-axis gyroscope, and a digital motion processor as one assembly. In addition, the motion tracking sensor 242 may be disposed at regular intervals along the outer surface of the head part of the controller 200 as shown in the drawing, and each motion tracking sensor 242 may have a round recessed opening form. The motion tracking sensor 242 tracks the posture and movement direction of a user who grips the controller by tracking the movement direction, movement speed, and movement degree of the controller.

A plurality of user input units 260 may be provided on the grip part of the controller 200. The user input unit may include, for example, keys disposed inside the grip part, a touch pad (or a track pad) provided outside the grip part, and a trigger button.

The microprocessor 250 may control to track the user's motion and movement through sensors. In addition, the microprocessor 250 may operate in linkage with the camera 121 provided in the electronic device 100 to recognize the external environment during a virtual reality experience. For example, a PIP-type external environment image may be displayed in a small size at the position of the controller 200 in the virtual space image.

Figure 5:
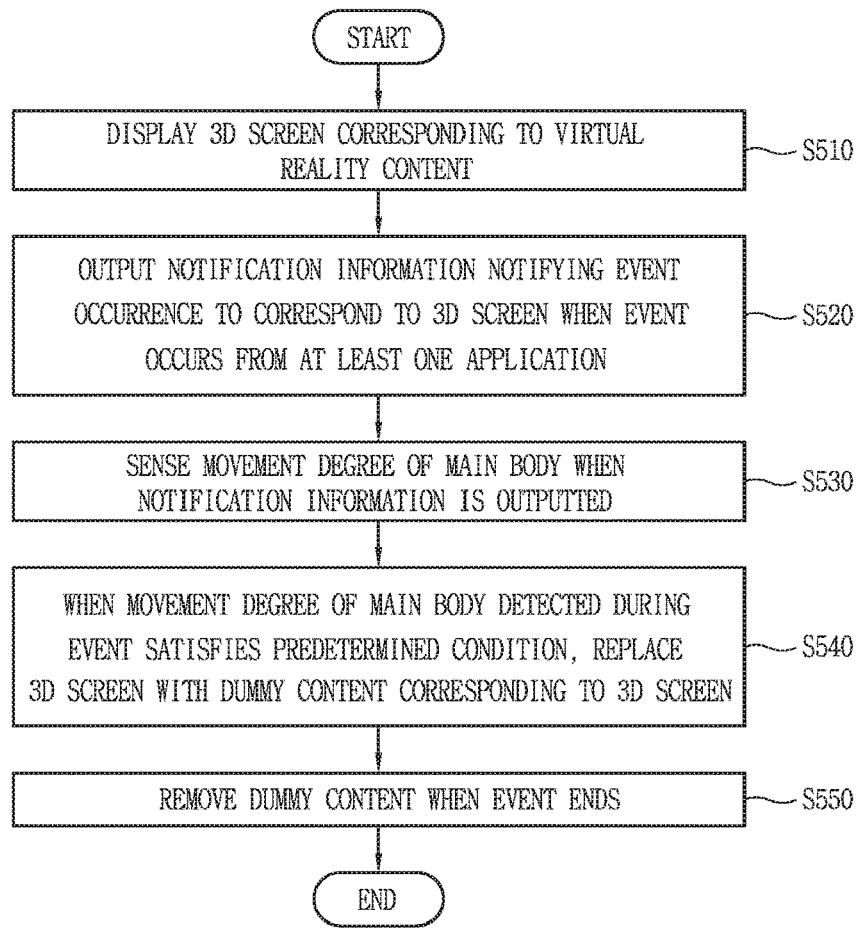
FIG. 5 is a representative flowchart illustrating operations implemented in an electronic device related to the present invention.

FIG. 5 is a representative flowchart illustrating operations implemented in an electronic device related to the present invention.

Referring to FIG. 5, a 3D scene corresponding to virtual reality content is firstly played back on the display unit 151 (see FIG. 3B) of the electronic device 100 (S510).

Here, the played virtual reality content (hereinafter referred to as "first virtual reality content") may be stored in the electronic device 100 or received from the external device 500 (see FIG. 1) connected to the electronic device 100. There is no limitation on the type of the first virtual reality content and for example, it may include all cases that a home screen or a specific application outputted to the display unit 151 of the mobile terminal 100, that is, all kinds of programs that can be driven by the mobile terminal 100 such as programs related to a web browser, a video playback, a calendar, a call, a game, a music, a document work, a message, a finance, an e-book, traffic information, programs for performing a function for updating application, etc. are outputted to the virtual space image.

In such a way, while the 3D screen corresponding to the first virtual reality content is being played back, the electronic device 100 (see FIG. 1) may detect occurrence of an event in at least one application. Then, the control unit 180 (see FIG. 3B) of the electronic device 100 may output notification information for notifying the event occurrence to correspond to the 3D screen (S520).

Here, an event is a case where a specific action is executed in a specific application installed in the electronic device 100 or the external device 500 connected to the electronic device 100, and for example, there may be a case where a message is transmitted, a call is received, an automatic update is performed, a music play, a movie play, or a web browser is executed according to predetermined information, or an alarm occurs. The electronic device 100 may recognize that such an event occurs through the event detection unit 181 of the control unit 180, for example.

In addition, a method of displaying the notification information for notifying the event occurrence may vary according to the type of the event and the type of 3D screen being played back. Accordingly, the notification information corresponding to the event is outputted in correspondence to the 3D screen, which means that the display method of the notification information is variously modified according to the position and shape of the virtual object displayed on the 3D screen. For example, the notification information may be displayed in the form of being exposed in a virtual billboard of the 3D screen, or the notification information may be displayed in the form that an envelope is placed on a virtual object (e.g., a chair, a table, etc.) of the 3D screen.

When the notification information is outputted, the electronic device 100 may continuously monitor the movement of the user wearing the electronic device 100 by continuously sensing the degree of movement of the main body detected through the sensors provided (S530).

Specifically, the electronic device 100 activates all motion sensors provided on the front of the electronic device 100 and all motion detection sensors provided on the controllers 200A and 200B to continuously monitor the degree of movement of a user. Here, the range determined by the user's movement naturally includes the movement of the electronic device 100 itself, and also the movement of the controllers 200A and 200B linked thereto. For example, when the movement of the electronic device 100 itself is slowed but the controllers 200A and 200B are actively moving, it is determined that the user's movement is active. To this end, the electronic device 100 may receive the movement information independently obtained through the motion detection sensors of the controllers 200A and 200B to determine whether the movement of the user is slowed down.

Next, when the degree of movement of the user detected during the event satisfies the predetermined condition, the control unit 180 replaces the 3D screen being played back with dummy content corresponding to the 3D screen (S540). Here, the predetermined condition indicates a case where the degree of movement of the user is slowed to less than the critical range. In addition, the critical range for determining whether the degree of movement is slowed may be changed according to the type of content corresponding to the 3D screen being played back and the average movement degree of the user before event occurrence.

Specifically, the control unit 180 may continuously compare whether the degree of movement of the user is reduced within a predetermined critical range. When it is determined according to a result of comparison that the movement of the user is slowed less than the critical range, the control unit 180 determines that the user intends to confirm the event or responds to the event. That is, the electronic device 100 according to an embodiment of the present invention does not determine that the user wants to confirm the event depending on whether or not the user responds to the notification information. Accordingly, even when the user actually checks the event, while the degree of movement of the user is within or exceeding the critical range, it is determined that the user has an intention to continue the virtual reality experience, thereby maintaining the playback state of the 3D screen continuously.

When the user's movement is slowed down to less than the critical range, the playback interruption of the 3D screen and the playback of the dummy content occur simultaneously (or seamlessly linked), so that the virtual reality experience is not disconnected while the user checks the event. That is, the user may experience the perspective and the movement of an object as it is as if viewing the previous 3D screen even while the dummy content is played back. For example, as a user wearing the electronic device 100 moves the hand or the head or performs walking within a specific closed space, the perspective, the contrast, and the saturation of objects in the dummy content are variously modified. Also, even when the user does not move, a specific object in the content may move toward a specific direction (e.g., a direction in which the user is present, a target in the dummy content, etc.) according to the playback of the dummy content.

In one embodiment, the dummy content refers to other virtual reality content (hereinafter referred to as "second virtual reality content") including one or more dummy objects. While the dummy content is being played back, the playback-stopped state of the 3D screen is maintained. At this time, the playback stop time point of the 3D screen may coincide with the playback time point of the dummy content, or the dummy content may be seamlessly played back as soon as the playback of the 3D screen is stopped.

Also, in one embodiment, the dummy content may be associated with a 3D scene being played back. Such dummy content may be stored in advance in the electronic device 100 or the external device 500 connected thereto, or may be provided from the content itself corresponding to the 3D screen being played back. In the former case, a plurality pieces of dummy content may be stored in advance in the electronic device 100 or the external device 500 connected thereto, and in such a case, dummy content of the same or the most similar type as the type of the 3D screen being reproduced may be selectively detected.

In addition, in one embodiment, the playback-related setting of the dummy content may correspond to the playback-related setting of the 3D screen. For example, the playback speed and sound level of the dummy content may match the playback speed and sound level before the 3D screen is stopped. Accordingly, a difference in experiencing the virtual reality space by a user while confirming the event and after confirming the event may be small or completely removed.

In addition, one or more dummy objects appearing in the dummy content may be configured based on virtual objects that appeared at the time of stopping the playback of the 3D screen. For example, images of the same or similar shape as the object appearing when the 3D game is stopped may appear in the dummy content, and such an object may perform the same attributes and functions as those in the 3D game.

On the other hand, the notification information outputted on the 3D screen disappears from the 3D screen being played back when there is no user confirmation for a predetermined time. Thereafter, it is not necessary to monitor whether the movement of the main body is slowed in order to trigger the playback of the dummy content, so that the related sensors may be switched to an inactive state.

When the event ends as the dummy content is played back, the playback of the dummy content naturally stops. That is, when the event ends, the control unit 180 immediately removes the dummy content to smoothly provide the previously as viewed 3D screen, i.e., the first virtual reality content (S550).

Specifically, the user experiences the second virtual reality content during the event confirmation, and the 3D screen returns to the corresponding first virtual reality content at the same time when the event ends. That is, although content experienced during the confirmation of the event and content experienced after the end of the event are different from each other, experience feeling in the virtual space remains the same, so that even when the user returns to the first virtual reality content after the end of the event, motion sickness does not occur.

According to the embodiment described above, even when the user confirms the event during the virtual reality experience, the virtual reality is not disconnected and the user can return to the 3D screen without causing the motion sickness even after the end of the event.

Figure 6:
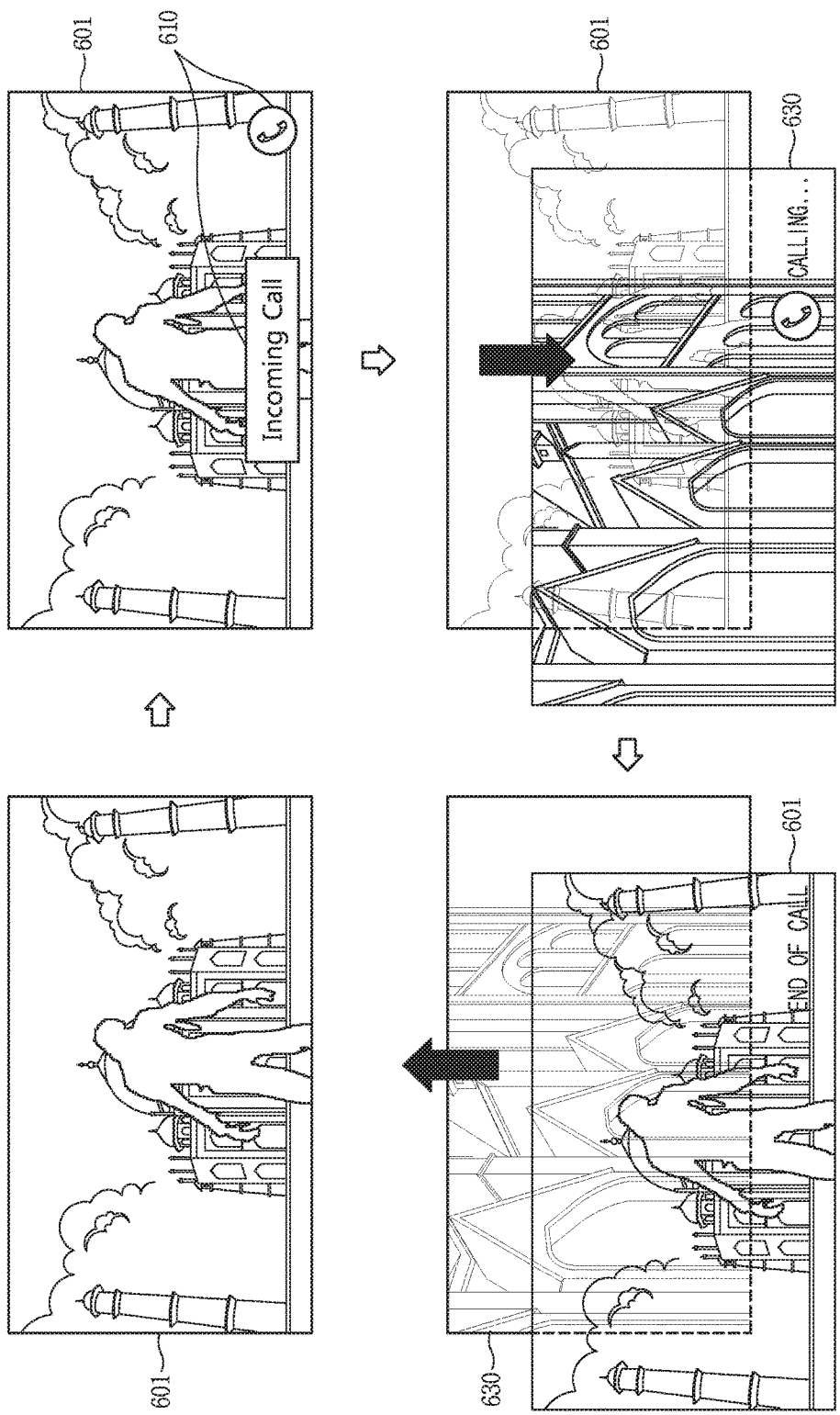
FIG. 6 is a conceptual diagram showing an operation implemented in an electronic device related to the present invention.

FIG. 6 is a conceptual diagram showing an operation implemented in an electronic device related to the present invention.

Referring to FIG. 6, a 3D game screen 601 corresponding to the first virtual reality content may be displayed on the display unit 151 of the electronic device 100. When a call reception event occurs while the 3D game screen 601 is being displayed, notification information 610 notifying that the call reception event occurs, for example, "Incoming Call" and a phone image, may be displayed in the 3D game screen 601. At this time, for example, the notification information 610 may be displayed in the form of an augmented reality (AR) object at a lower position of the 3D game screen 601 as shown in FIG. 6.

When the user's movement is slowed below a predetermined range while the user is responding to the call reception, the playback of the 3D game screen 601 is stopped and the playback of the alternative 3D screen 630 corresponding to the second virtual reality content is triggered.

Herein, whether or not the user's movement is slowed down below the predetermined range is determined by a six-axis motion tracking device including a three-axis acceleration sensor and a three-axis gyroscope, which are provided in the controllers 200A and 200B operating in linkage with the electronic device 100. When the movement information obtained through the six-axis motion tracking device of the controllers 200A and 200B is received by the electronic device 100, the electronic device 100 may determine whether or not the movement of the user is slowed down based on the received movement information of the controllers 200A and 200B and the movement of the electronic device 100 itself (or only the movement information of the controllers 200A and 200B).

At this time, as shown in FIG. 6, the first layer in which the 3D game screen 601 was played back is maintained, and a new second layer of a space separation concept is generated. Then, the 3D screen 630 is played back while the second layer is placed above the first layer as when it is a glass film. To this end, the control unit 180 may control to generate the second layer different from the first layer where the 3D game screen is played back, at the initial time point that the slow-down movement of the user is detected. And, in response to that the user's movement is reduced below the reference range, the second virtual reality content, i.e., dummy content, may be played back on the second layer. While the dummy content is being played back in such a way, the first layer in which the 3D game screen 601 was played back is kept at the lower position of the second layer.

Although it is shown in FIG. 6 that the alternative 3D screen 630 corresponding to the dummy content descends from the top to the bottom with reference to the user's eyes, the present invention is not limited thereto. For example, the second layer may appear in a form of moving from the left/right side to the right/left side with respect to the user' eyes, or appear in a form of rising from the first layer.

While responding to the call reception, the alternate 3D screen 630 may display an indicator 630 indicating that a call response is in progress. Then, the call voice may be outputted through the headset of the electronic device 100. Also, although not shown in the drawing, while the alternate 3D screen 630 is being played back, the perspective, brightness, and saturation of a virtual object displayed in the alternate 3D screen 630 may be correspondingly modified according to the movement of the user's head or hand. Accordingly, the user continues to maintain the same virtual space experience as before the call reception even during the call.

Also, although not shown in the drawing, a graphic object indicating that the currently displayed 3D screen is dummy content may be displayed in the alternative 3D screen 630 while the alternative 3D screen 630 is being displayed.

On the other hand, even when a user input in response to a call reception is applied, the playback state of the 3D game screen 601 is maintained continuously while the movement of the user is within a predetermined range or exceeds the predetermined range. Here, the predetermined range means that the movement of a motion detected through the six-axis motion tracking device of the controllers 200A and 200B does not deviate from the average motion movement degree before the occurrence of the event. Accordingly, while the movement of the user is within or exceeding the predetermined range, it means that the movement of the user is not slowed down even after the occurrence of the event.

For example, when the user responds to a call reception but continues to move or actively moves the controller, the electronic device 100 determines that the intention of the user is to continue to experience the currently-viewing 3D game screen 601, and continuously provides the 3D game screen without interruption. However, at this time, the user continuously monitors the degree of movement while maintaining the call. Accordingly, when the movement of the user performing the call is slowed down, the control unit 180 may stop the playback of the 3D screen based on the time point at which the movement of the user is slowed down, and may play back the related dummy content.

When the call is terminated while the alternative 3D screen 630 is being played back, the alternative 3D screen 630 being played back disappears. At this time, as shown in FIG. 6, the second layer in which the alternative 3D screen 630 is played back may disappear in a direction opposite to the emerging direction, for example, in an upward direction. When the second layer is removed as if a glass film disappears, the 3D game screen 601 is played back at the same time when the first layer is exposed. At this time, notification information (e.g., call termination) indicating the end of the event may be displayed on the 3D game screen 601 for a predetermined time and disappear.

On the other hand, the alternative 3D screen 630 may be played back on the first layer without generating the second layer. Even in this case, when the event returns to the real content according to the end of the event, switching between the dummy content and the real content is seamlessly performed.

As described above, the electronic device according to the present invention may maintain the experience feeing of a virtual space while checking an event occurring during a virtual space experience and returning to the virtual space experience again, thereby solving the possibility of causing motion sickness.

FIG. 7 illustrates an example of a method of configuring an alternate 3D screen that is played back during an event check.

Referring to FIG. 7, when movement is slowed down while a user answers a call reception, one or more virtual objects 711 may be displayed on the playback-stopped 3D screen 701 at the time point that the movement of the user is slowed down.

The virtual object 711 may move toward a certain direction or a specific target according to a program command constituting the first virtual reality content. In addition, a first indicator 702a indicating the playback-stopped state is displayed on the playback-stopped 3D screen 701.

A virtual object 722 (hereinafter referred to as a "dummy object") in a 3D replacement screen 720 corresponding to the second virtual reality content is generated by mimicking the virtual object 711 included in the playback-stopped 3D screen 701. To this end, the control unit 180 may detect the virtual object 711 from the 3D screen 701, and obtain the shape and movement information of the detected virtual object 711 to provide it to the second virtual reality content.

The dummy object 722 may move in a certain direction or a specific target that the virtual object 711 was heading. However, the movement of the dummy object 722 does not correspond to the movement of the virtual object 711, so that the cheating problem of the first virtual reality content does not occur.

Also, the background image of the 3D replacement screen 720 corresponding to the second virtual reality content may be generated to correspond to the background image of the playback-stopped 3D screen 701. To this end, after capturing the 3D screen 701 in the playback-stopped state in a sphere form, the electronic device 100 may combine the 3D screen 701 captured in the sphere form with the original 3D dummy content, or configure it as an initial screen.

When the event ends, the 3D screen 701 whose playback is stopped is played back again, and a second indicator 702b indicating that playback is in progress is displayed in the screen.

Also, although not shown in the drawing, in another embodiment, a part of the already-experienced section among pieces of the first virtual reality content may be configured by the 3D replacement screen 720. For example, the control unit 180 jumps the first virtual reality content from the first view point of the playback-stopped 3D screen 701 to the second view point ahead of a predetermined section so that playback from the second time point may be replaced with the second virtual reality content. At this time, when the event confirmation continues until it is close to the first time point corresponding to the playback-stopped 3D screen 701, the control unit 180 may jump to the second time point again, or jump from the second time point to the third time point ahead of a predetermined section to play back the first virtual reality content. At this time, when the event ends, the user may jump directly to the first time point corresponding to the 3D screen 701 in the playback-stopped state.

On the other hand, by providing the dummy content during the event check, the user's virtual space experience is maintained, but when returning to the real content immediately after the end of the event, it may take time to adapt to the real content again. Especially, when the real content is game content affecting a score or when a time point at which the real content is resumed is a scene in which a situation is drastically changed, it is difficult to expect the user's immediate adaptation.

Figure 8:
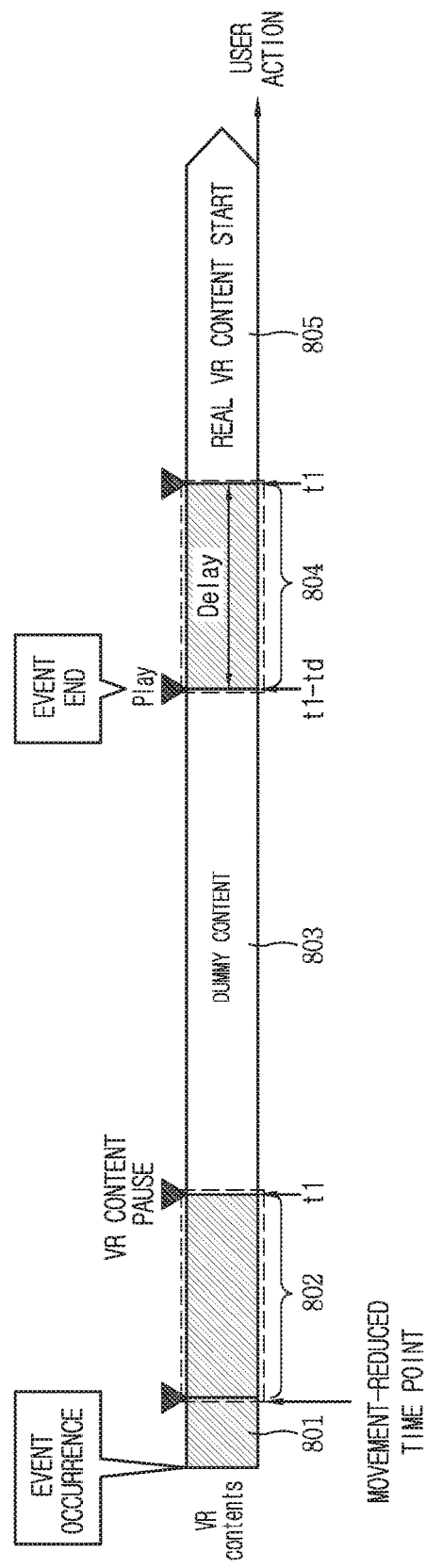
FIGS. 8 and 9 are conceptual diagrams related to a method of providing a delay time when a 3D screen is played back again in an electronic device according to an embodiment of the present invention.

Accordingly, FIG. 8 shows a view that, at the time point that an event ends, the real content is not provided directly from the playback-stopped time point and a delay section 804 is provided in order for adaptation to the real content.

In the graph of FIG. 8, the horizontal axis represents a time change and a user behavior change. When a specific event occurs (801) while real content (i.e., VR content) is being played back, the user may check the event or may continue to experience the real content after ignoring the occurrence of the event. Or, there may be needs to check the event and experience the real content at the same time.

The user movement may be gradually slowed down while confirming the event. Then, when the movement reaches a time point (t1) that is slower than a predetermined range, the playback of the real content is immediately stopped. At this time, it is not important whether there is a user input for confirming the event in the section 802 where the movement of the user is slowed down or in the section 801 where the event occurred. As described above, the user may simultaneously experience the real content while checking the event.

That is, the time point (t1), which is not the event confirmation time point but that the movement degree of the user is less than the predetermined range, becomes the playback stop time point of the real content and the playback time point of the dummy content. In the section 803 in which the dummy content is played back, the playback-stopped state of the real content is maintained.

Then, when the event ends while the dummy content is being played back, the control unit 180 plays back the real content, that is, the 3D screen, from the second time point (t1-td) ahead of a predetermined time at the playback-stopped first time point (t1). Here, from the second time point (t1-td) to the first time point (t1) at which the playback of the 3D screen is stopped is the delay section 804 shown in FIG. 8. In this way, by providing the resume delay section of the real content, the user may naturally prepare for game content requiring fast movement or a rapidly changing scene. When the delay section elapses, a new scene of real content is played back (805).

In one embodiment, the delay section may be determined differently based on the type of real content. Specifically, when the content type of the 3D screen is content such as a game, which requires a lot of movement of the user, or content of an action movie with a fast situation change, a time interval from the second time point (t1-td) or the second time point (t1-td) to the first time point (t1) may set the delay section to be slightly longer in consideration of user adaptation. Also, in the case of content such as shopping or the like, in which a user carefully and slowly looks at a specific virtual object, the delay section may be set to be short or omitted exceptionally.

In addition, even with the same content, the delay section may be adaptively selected differently depending on the situation information collected just before the real content is stopped, for example, a game level and the number of enemies appearing in the game, Alternatively, it is possible to set a specific time point in a situation before the real content is stopped as the start point of the delay section. For example, when the playback of the real content is stopped after 5 seconds when a user enters a specific space (e.g., a cave), the control unit 180 of the electronic device 100 may control playback related operations such that the start point of the delay section matches a time point entering a particular space (e.g., a time point entering the cave entrance).

Figure 9:
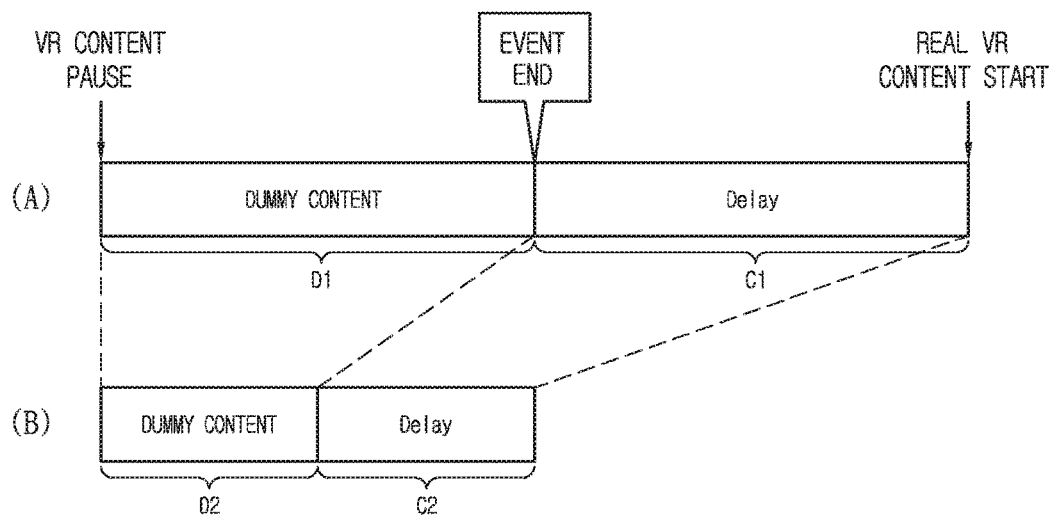

In another embodiment, the delay section may be set so as to correspond to the time at which the user confirms the event. In relation to this, referring to FIG. 9, when a case (A) has a longer playback time D1 of dummy content than a case (B), it is confirmed that the length of the delay section C1 of the case (A) is set to be longer than that of the delay section C2 of the case (B). That is, when the playback time of the dummy content is long, it may mean that a time that a user takes to confirm the event is long, so that the delay section may be proportional to the total playback time of the dummy content.

For example, when a user talk time is about 10 seconds, the delay time may be about 5 seconds. Also, when a user talk time is more than 30 minutes, the delay time may be longer than 10 seconds to 20 seconds.

On the other hand, when the second event occurs in the delay section C1 or C2 and then the movement of the user is slowed down below the reference range, the delay section C1 or C2 may be stopped and the dummy content may be played back again.

At this time, the time point at which the real content is stopped in the delay section may not be recorded in the electronic device 100. That is, when the delay section is reset based on the stop time point of the delay section after the end of the second event, there is an inconvenience that the user's adaptation time becomes longer than necessary. Therefore, when the second event ends, the delay section may be set again based on the time point at which the real content was first stopped, not the stop time point of the delay section.

Also, although not shown in the drawing, the control unit 180 controls to output a sound volume below a certain level at the start point of the delay section and increase the sound volume gradually during the delay section, so that it may help users to adapt to the sound of real content naturally.

As described above, when the real content is returned after the end of the event, the delay section is provided, so that it allows a user to adapt to the real content naturally.

Figure 10:
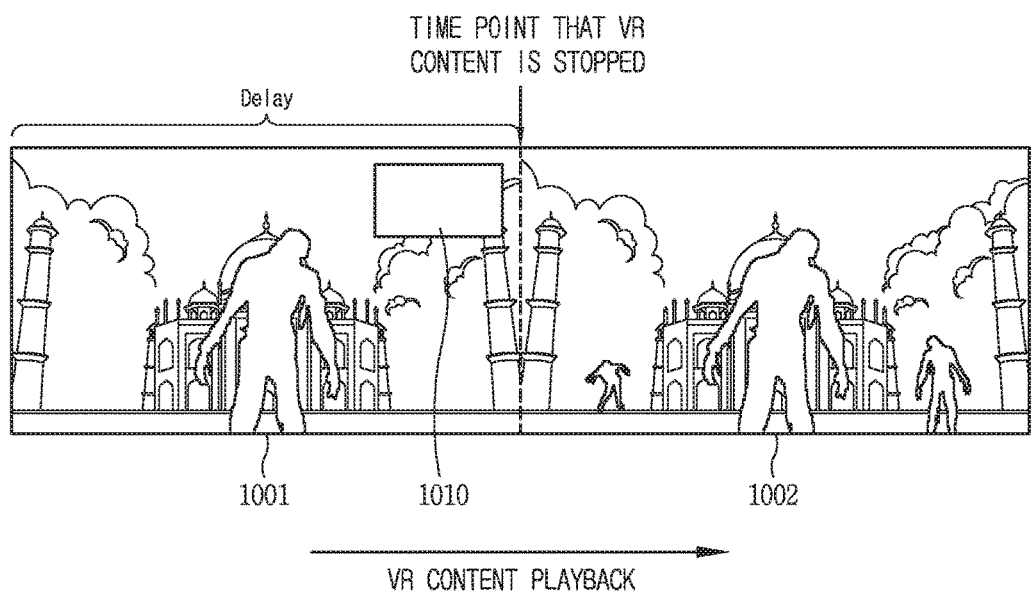
FIGS. 10 and 11 are exemplary conceptual diagrams related to additional information provided when a 3D screen is played back again in an electronic device according to an embodiment of the present invention.
Figure 11:
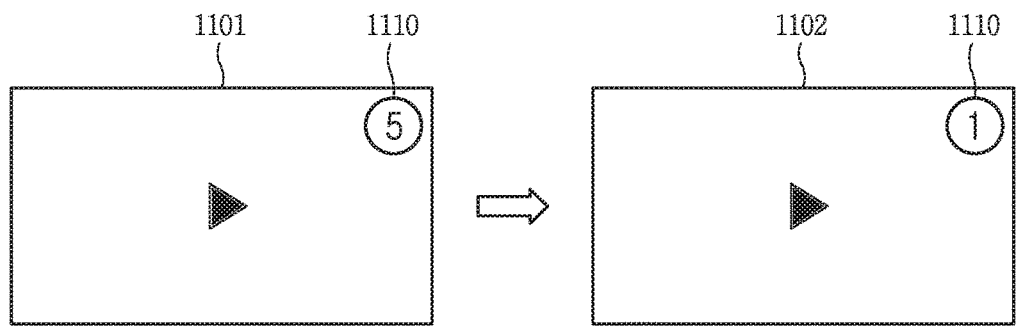

Hereinafter, FIGS. 10 and 11 show different examples of providing additional information related to real content during a delay section.

As the playback time of the dummy content is longer (or as the event confirmation time is longer), it is more difficult for a user to remember the last situation or scene of the real content. Thus, in one embodiment, when the playback time of the dummy content exceeds a predetermined time range, while the real content is being played back again from the second time point to the first time point, i.e., during the delay section, additional information related to the 3D screen of the playback-stopped time point may be provided. To this end, the 3D screen 1001 of the delay section may include an information output area 1010.

Here, the kinds of the additional information that can be outputted to the information output area 1010 vary widely. For example, the additional information may include user movement information, a content usage history, and 3D screen control information. For example, when the real content is a movie, a playback bar indicating a playback-stopped time point and a volume bar indicating a volume size may be outputted as the additional information. As another example, when the real content is a game, a graphic object indicating a game record and the current position on the map may be outputted as the additional information. The user may see the additional information provided during the delay section and may be more quickly immersed in the previous situation of the real content.

In addition, such additional information also disappears naturally on the screen when the delay section ends and the 3D screen (1002) of the playback-stopped time point appears.

In another embodiment, as shown in FIG. 11, count information 1110 related to the first time point, i.e., the time point at which the playback of the real content is stopped, may be displayed on the 3D screens 1101 and 1102 provided during the delay section. The count information 1110 may be displayed in a manner of reversely counting the remaining time until the first time point (e.g., in the form of modifying numbers in the order of 5, 4, 3, 2, 1). Thus, the user may accurately predict where the real content will actually start.

On the other hand, although not shown in the drawing, a user may move directly to the time point where the playback of the real content is stopped even during the delay section. Specifically, when a predetermined input is received during the delay section, i.e., while a 3D screen is being played back from a second time point after the playback of dummy content is stopped, the control unit 180 may jump directly to the first time point and control the playback of the 3D screen. Herein, the predetermined input may include a case of pushing or touching a button provided on the frame of the electronic device 100 or a button provided in a controller and a case of inputting a predetermined voice command.

Figure 12:
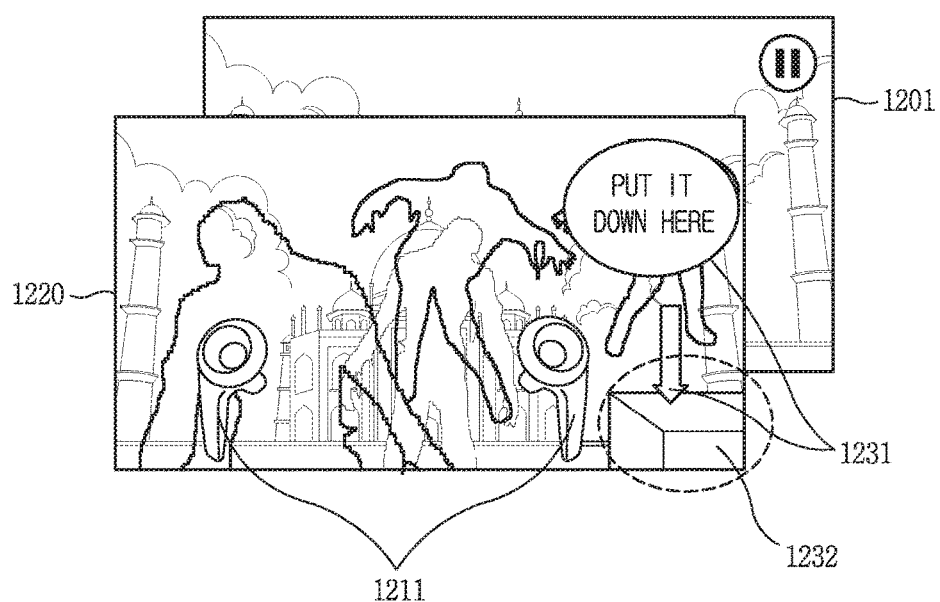
FIG. 12 is an exemplary conceptual diagram related to a method of guiding the seating position of a linked controller in an electronic device according to an embodiment of the present invention.

Hereinafter, FIG. 12 shows an example related to a method of guiding the seating position of a controller linked with the electronic device 100 when the movement of a user is slowed down.

When the movement of the user is slowed down according to the event confirmation, the user may want to drop the controllers 200A and 200B, which are peripheral devices linked with each other. For example, when the frequency of using the controller during a call is reduced, a user may want to put the controller down while wearing the electronic device 100 as it is.

At this time, the front camera 121 provided in the electronic device 100 may be used to recognize the actual external environment and then, the controller may be put down. However, in such a case, it is inconvenient to check again the actual position of the put-down controller by using the front camera 121.

Thus, when the playback time of the dummy content exceeds a predetermined time range in the grip state of at least one controller 200A or 200B, the control unit 180 determines that there is a need for the user to put down the controller. Accordingly, guide information for guiding the seating of the controllers 200A and 200B is generated, and the generated guide information is outputted corresponding to the dummy content.

To this end, the control unit 180 first recognizes the actual external environment by driving the front camera 121 provided in the electronic device 100. The control unit 180 extracts the position of a specific object (e.g., a table, a sofa, etc.) that can seat the controller from the image of the actual external environment. At this time, the position where the controller is to be put down is may be the position where the user can stretch the arm and put the controller down at once, so that the position of the specific object is selected near the user's current position. Once the location of the specific object is extracted, it maps the extracted location to the location of the alternate 3D screen corresponding to the dummy content. Next, guide information 1231 (e.g., text information and an arrow image) that guides the mapped location is outputted in the alternative 3D screen 1220.

When the guide information is outputted in such a manner, the image 1211 corresponding to the controller is displayed in the alternative 3D screen 1220, thereby inducing the user's seating operation.

On the other hand, a virtual object 1232 configured based on an object existing in actual reality is displayed at the position guided by the guide information. That is, a specific object existing in the actual external environment is also displayed on the alternative 3D screen 1220. However, the virtual object 1232 appears not as an image of an actual object but is modified and appears as an image of an object (e.g., a rock, etc.) suitable for an alternative 3D screen 1220 being played back.

The virtual object 1232 may be continuously maintained in the delay section. At this time, during the delay section, second guide information (e.g., a message to pick up the controller and an arrow image) inducing a user to pick the controller placed on the virtual object 1232 again may be displayed on the screen during the delay section. The virtual object 1232 disappears from the screen when the user grips the controller 200A, 200B or when the real content reaches the playback-stopped time point 1201.

Hereinafter, it is clarified in advance that the 3D screen corresponding to the virtual reality content and the virtual reality content can be mixed in the same meaning.

In addition, the movement information or the degree of movement of a user wearing the electronic device 100 may include all information relating to the position of the user, the movement direction, the movement speed, the posture, and the motion, and the location/direction of a part (e.g., the above) of the body, which are sensed through the sensors provided in the main body 100 and the controllers 200A and 200B.

Figure 14B:
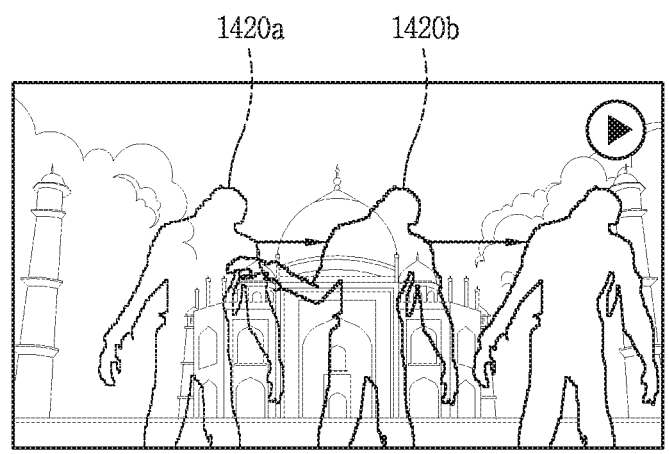
FIGS. 14A to 15 are conceptual diagrams illustrating the control method of FIG. 13 in an electronic device according to an embodiment of the present invention.
Figure 15:
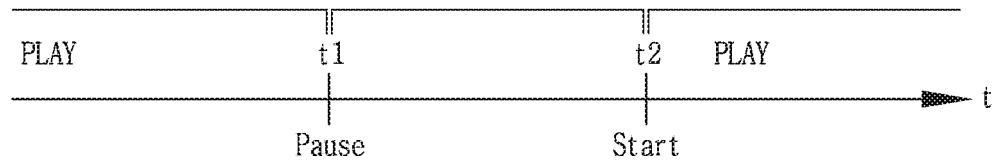

FIG. 13 is a flowchart illustrating a method of providing movement information of a user on playback-stopped virtual reality content in an electronic device according to an embodiment of the present invention, and FIGS. 14A to 15 are conceptual diagrams illustrating the control method of FIG. 13 in an electronic device according to an embodiment of the present invention.

First, referring to FIG. 13, the control unit 180 of the electronic device according to the present invention may play back the virtual reality content (S1310).

The virtual reality content may be a 3D image. Such virtual reality content may form a virtual reality space through 3D images. When the virtual reality content including such 3D images is played back, a user makes an illusion that the user is actually present in the virtual reality space formed by the virtual reality content. Thus, the user may move around in the virtual reality space and take actions as if the user is in the real world.

Also, the virtual reality content may be changed according to the interaction with the user. For example, when a user lifts an object in virtual reality content, the user may change the content on the virtual reality content as if the user actually lifted the object. As another example, when the user takes a movement from the first point to the second point of the virtual reality space formed by the virtual reality content, by also providing the virtual reality content as the content in the form of moving from the first point to the second point, the user may feel that the user is actually located in the virtual reality space.

The control unit 180 can play back the virtual reality content. As a time elapses to allow a user to view the virtual reality content, the playback of the virtual reality content in the present invention is the operation of an electronic device that displays the virtual reality content on the display unit 151 in an appropriate form.

The control unit 180 may play back the virtual reality content based on the playback command inputted from a user. Such a playback command may be inputted through a user input unit provided in the electronic device.

The control unit 180 may sense the movement information of the user during the playback of the virtual reality content (S1320).

The control unit 180 may sense the movement information of the user during the playback of the virtual reality content. The control unit 180 may determine the movement information of the user through the lighthouse system described above. The technique for detecting the movement information of the user is replaced with the above description.

Meanwhile, the electronic device of the present invention may further include the controllers 200a and 200b (see FIG. 2) formed to be gripped by a user's hand. In this case, the control unit 180 may sense not only the movement of the main body but also the movement of the controllers 200a and 200b through the light house system. In such a way, the movement of the main body and the movement of the controller may be named as user movement information.

The movement information of the user may include the position of the main body and the posture information of the main body in the virtual reality space formed by the virtual reality content. In addition, the movement information of the user may include the body movement of the user wearing the main body and the body posture information of the user. The posture information of the main body, as information indicating a form that the main body is located in the virtual reality space, may include information on the direction in which the main body views the virtual reality space content, position information of the main body in the virtual reality space, and the like.

The control unit 180 may determine the movement information of the user at a predetermined time period interval or in real time. Then, the control unit 180 may store the playback time point of the virtual reality content and the movement information of the user at the playback time point. Thus, the movement information of the user at a specific playback time point may be stored in the memory.

When the playback of the virtual reality content is stopped, the control unit 180 may detect the movement information of the user at the time point that the playback is stopped (S1330).

In one embodiment, the movement information of the user may be continuously obtained after the notification icon corresponding to the event subsequent to the occurrence of the event described above is outputted, and when the movement of the user is slowed down below the reference range and replaced with dummy content, the movement information of the user at the time point may be detected and stored in the memory 160. The movement information at this time may include the user's posture and direction information (e.g., motion direction).

The control unit 180 may stop the playback of the virtual reality content based on a user request or predetermined conditions. The predetermined condition may be a condition in which event related control is performed on the electronic device. For example, the control unit 180 may stop the playback of the virtual reality content when a control command for confirming the content of a message is applied during the playback of the virtual reality content.

The control unit 180 may detect movement information of the user at the time point t1 (see FIG. 15) that the playback is stopped when the playback of the virtual reality content is stopped. However, the present invention is not limited thereto, and the control unit 180 may also detect the movement information of the user at the time points before and after the time point at which the playback is stopped.

When the playback of the virtual reality content is stopped, the control unit 180 may display a guide image indicating the movement information of the user (S1340).

When the playback of the virtual reality content is stopped, the control unit 180 may output a guide image indicating the detected movement information of the user on the virtual reality content. More specifically, the control unit 180 may output a guide image indicating the position of the main body and the posture of the main body in the virtual reality space.

The guide image may be a silhouette image indicating the position of the main body and the posture of the main body.

For example, as shown in (a) and (b) of FIG. 14A, the control unit 180 may stop the playback of the virtual reality content based on a user request or a preset condition when the virtual reality content is being played back. In this case, as shown in (c) of FIG. 14A, the control unit 180 may output a guide image 1410 indicating the movement information of the user on the virtual reality content.

That is, as shown in FIG. 15, the control unit 180 may stop the playback of the virtual reality content for a time between t1 and t2, and play back the virtual reality content again at t2. At this time, the control unit 180 may output the guide image at the time of stopping the playback between t1 and t2 on the virtual reality content. Thus, after moving in the real world space for a time between t1 and t2, before playing back the virtual reality content again, though a guide image, a user may check the movement at the playback-stopped time point.

Accordingly, when playing back the virtual reality content again, a user may recognize his or her position and posture in the virtual reality space at the time of stopping the playback through the guide image. Accordingly, when playing back the virtual reality content again, a user may recognize his or her position and posture in the virtual reality space at the time of stopping the playback through the guide image.

Also, in one embodiment, when the dummy content disappears according to the end of the event and the virtual reality content is played back again, playback may be performed from the second time point ahead of a predetermined time (e.g., several seconds to one minute) from the first time point at which the playback of the virtual reality content is stopped and in such a case, the guide information may be outputted on the 3D screen from the second time point. In addition, when an interval between the second time point and the first time point becomes longer in proportion to the playback time of the dummy content, the guide information may not be outputted from the second time point but may appear at a time point (hereinafter, referred to as a "third time point") ahead of a predetermined time (for example, 5 seconds to 10 seconds) from the first time point. In such a case, count information until reaching the first time point from the third time point is outputted together with the guide information, so that it is possible to derive the posture or motion previously taken by a user.

At this time, the guide information may disappear immediately when the virtual reality content reaches the first time point. Alternatively, when it is determined that a user takes a posture or a motion so as to correspond to the guide information even before reaching the first time point, the guide information may disappear immediately.

Also, the control unit 180 may output a guide image indicating the movement tracking information of the user after the playback is stopped, when the playback of the virtual reality content is stopped. The movement tracking information of the user tracks the movement change of the user from the time point at which the playback is stopped to the current time point.

For example, as shown in FIG. 14B, the control unit 180 may display guide images 1420a and 1420b indicating information that tracks the movement change state of the main body from the time point at which the playback of the virtual reality content is stopped to the current time point. Accordingly, the user may check the his/her movement after the playback of the virtual reality content is stopped, and recognize the movement line for taking the movement at the playback-stopped time point when the virtual reality content is played back again.

Meanwhile, the control unit 180 may play back the virtual reality content again when a user requests or a predetermined condition is satisfied.

When a playback command for playing back the virtual reality content is inputted from a user or when the movement of the user coincides with the movement of the user at the virtual reality content-stopped time point, the control unit 180 may play back the playback-stopped virtual reality content again.

For example, in the state where a guide image indicating the movement of a user at the virtual reality content-stopped time point, when the movement of the user coincides with the movement of the user indicated by the guide image, the control unit 180 may play back the virtual reality content. Thus, the user may be provided with continuous virtual reality content.

The control unit 180 may no longer output the guide image indicating the movement of the user at the time of stopping the playback when the virtual reality content is played back again. Alternatively, the control unit 180 may no longer output the guide image as a predetermined time elapses after the guide image is outputted on the virtual reality content.

As above, when the playback of the virtual reality content is stopped, a method of receiving continuous virtual reality content is described.

Figure 16:
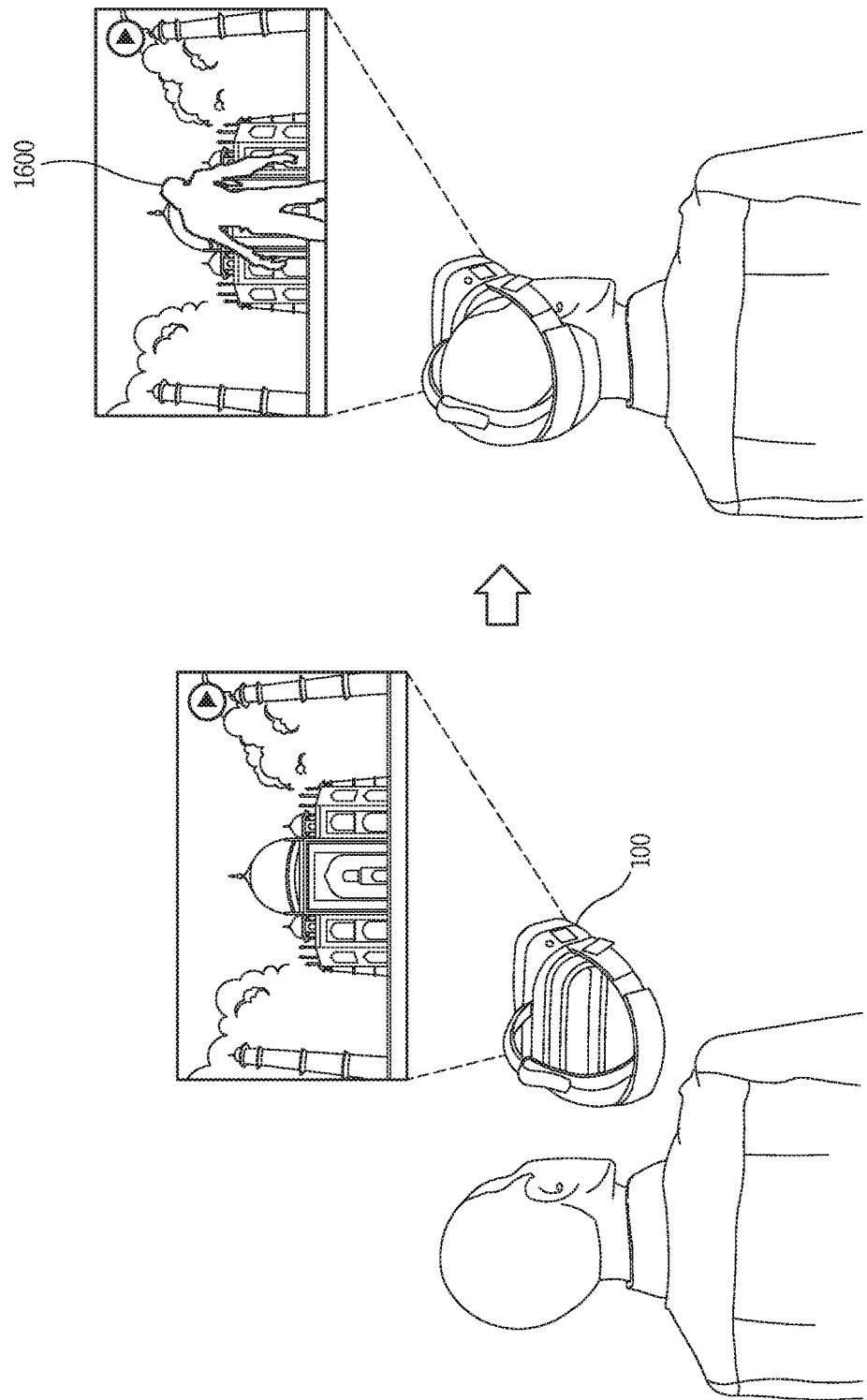
FIG. 16 is a conceptual diagram showing a method of providing a guide image according to whether or not a main body is detached in an electronic device according to an embodiment of the present invention.

Hereinafter, a method of providing a guide image in an electronic device according to an embodiment of the present invention will be described. FIG. 16 is a conceptual diagram showing a method of providing a guide image according to whether or not a main body is detached in an electronic device according to an embodiment of the present invention.

When the playback of the virtual reality content is stopped, the control unit 180 may output a guide image indicating the movement information (e.g., position, posture, motion, direction, etc.) of the user at the time that the playback is stopped.

The control unit 180 may output a guide image at a preset output time point. The predetermined output time point is may be one of a time point at which the playback of the virtual reality content is stopped, a time point at which the playback command of the playback-stopped virtual reality content is applied, and a time point at which the main body is worn on the user's body.

For example, when the playback of the virtual reality content is stopped, the control unit 180 may detect whether or not a user wears the main body. Then, as shown in FIG. 16(*a*), the control unit 180 may not display the guide image on the virtual reality content when it is not worn on the user's body. That is, the present invention may not output the guide image when the user does not recognize the guide image.

In addition, as shown in FIG. 16(*b*), the control unit 180 may display the guide image 1600 on the virtual reality content when it is worn on the user's body. That is, the present invention may output the guide image on the virtual reality content when the user can recognize the guide image.

Although not shown in the drawing, as another example, when a playback command for playing back the playback-stopped virtual reality content is applied, the control unit 180 may directly output the guide image on the playback-stopped virtual reality content, instead of immediately playing back the virtual reality content. Thus, the present invention may induce the movement of a user to be equal to the playback stop time point.

When the movement of the main body by the user's movement is identical to the movement of the main body indicated by the guide image, the control unit 180 may play back the virtual reality content from the playback-stopped time point without outputting the guide image any more.

The output time point of the guide image is described above.

Figure 17A:
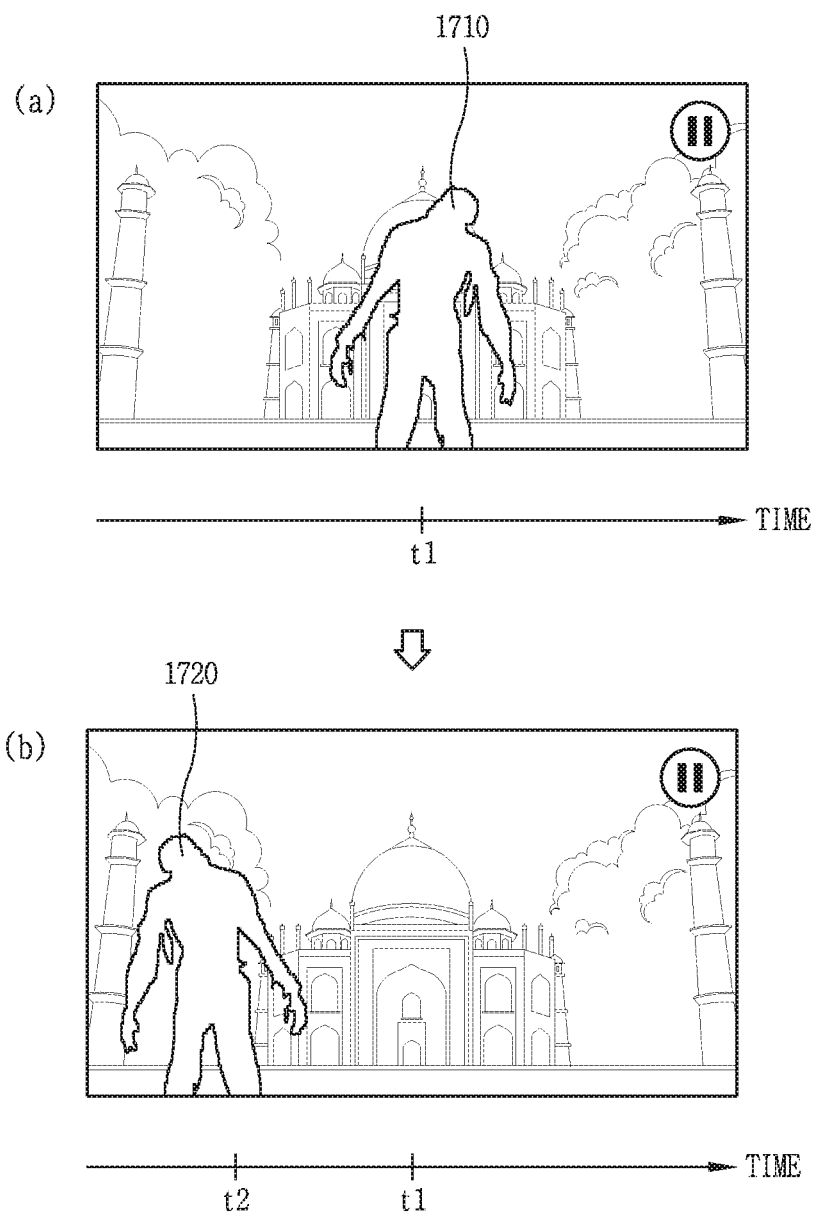
FIGS. 17A and 17B are conceptual diagrams showing a method of providing a guide image according to a playback time point in an electronic device according to an embodiment of the present invention.
Figure 17B:
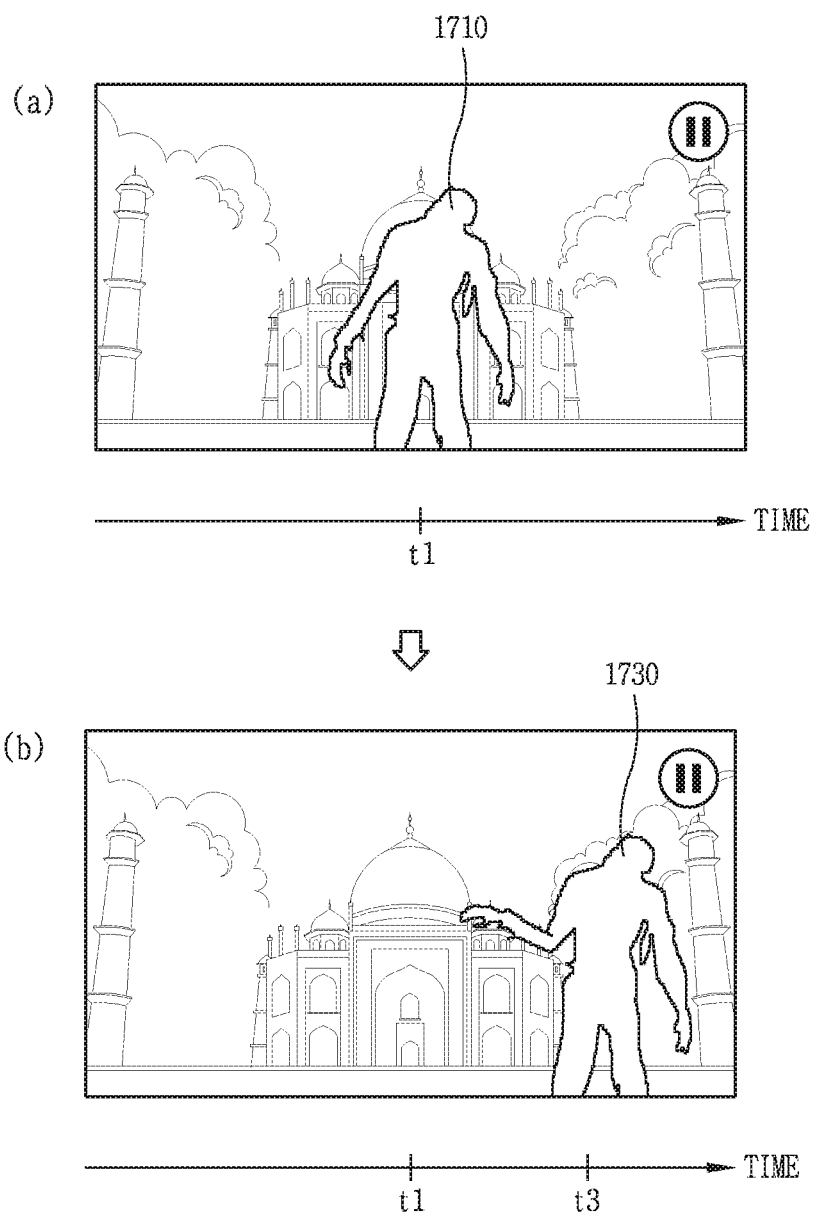

Hereinafter, a method of providing a guide image according to a playback time point will be described. FIGS. 17A and 17B are conceptual diagrams illustrating a method of providing a guide image according to a playback time point in an electronic device according to an embodiment of the present invention.

The control unit 180 may detect movement information of a user at each playback time point during the playback of the virtual reality content. When the playback of the virtual reality content is stopped, the control unit 180 may output the guide image on the virtual reality content.

The control unit 180 may receive a playback command for restarting the playback at a specific time point when the playback of the virtual reality content is stopped. The specific time point, as a time point different from the playback-stopped time point, may be a previous time point of the playback-stopped time point and may be a time point after the playback-stopped time point.

When a playback command for playback is applied at a specific time point different from the playback-stopped time point, the control unit 180 may output the guide image indicating the movement information of the user at the specific time point instead of directly playing back the virtual reality content from the specific time point. For example, as shown in (a) of FIG. 17A, when the playback of the virtual reality content is stopped, the control unit 180 may output a guide image 1710 indicating the movement of a user at the playback-stopped time point t1 of the virtual reality content. The control unit 180 may receive a playback command for starting the playback of the virtual reality content from the specific time point t2 which is a time point earlier than the playback-stopped time point t1. In this case, as shown in (b) of FIG. 17A, the control unit 180 may output a guide image 1720 indicating the movement of the user at a specific time point on the virtual reality content.

As shown in (a) and (b) of FIG. 17B, when a playback command for starting the playback of the virtual reality content from the future time point t3 later than the playback-stopped time point t1 of the virtual reality content is received, the control unit 180 may output the virtual reality content predicted to be played back at the future time point t3 and the guide image 1730 indicating the movement information of the user recommended in the predicted virtual reality content. The recommended movement information of the user may be the movement of the main body which can cause a minimal motion sickness to the user who views the virtual reality content.

Through this, even when the virtual reality content is played back again at the past time point or the future time point of the playback-stopped time point in addition to the playback-stopped time point, the present invention may minimize the motion sickness of a user.

Figure 18:
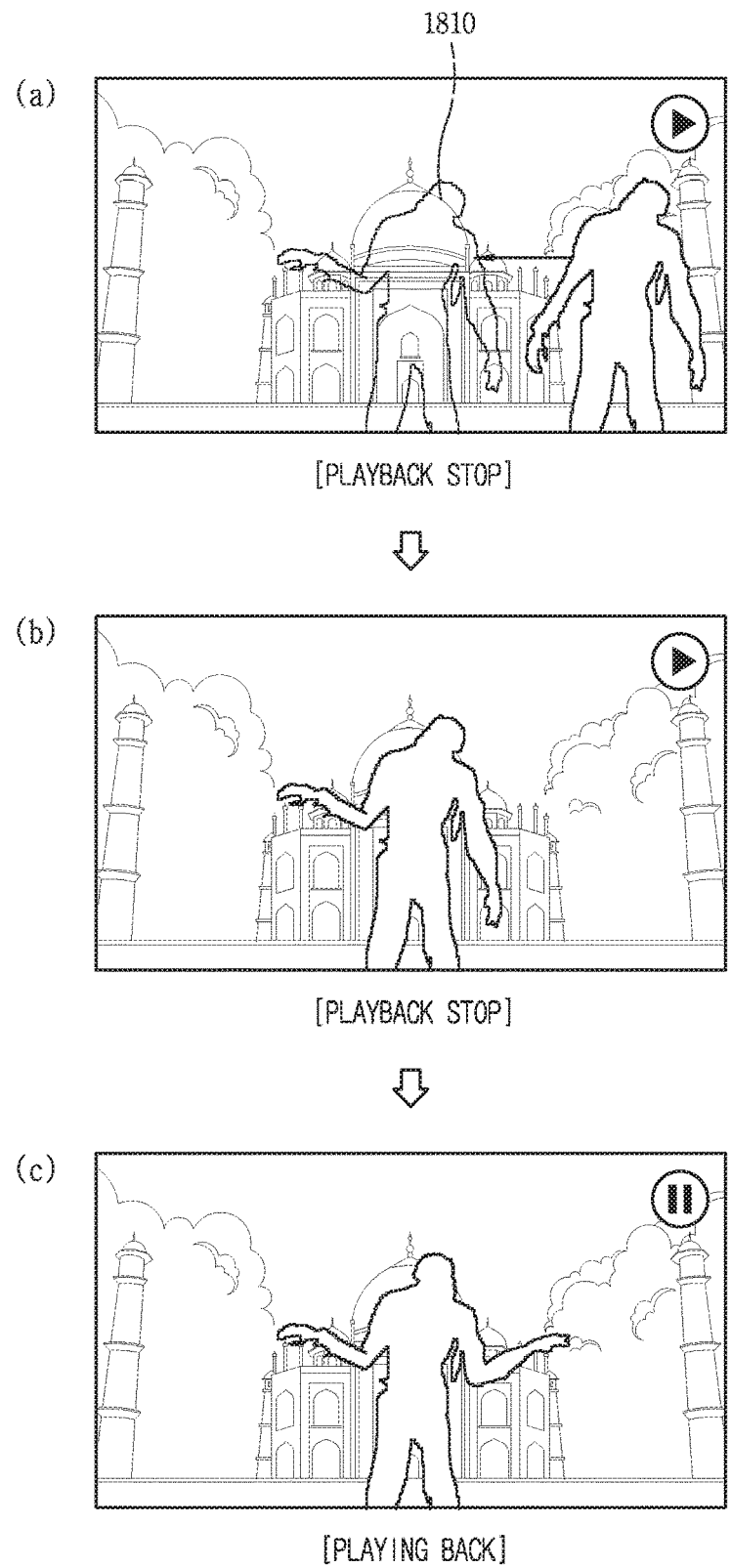

Hereinafter, a method of playing back the playback-stopped virtual reality content will be described. FIGS. 18 and 19 are conceptual diagrams showing a method of playing back playback-stopped virtual reality content again in an electronic device according to an embodiment of the present invention.

The control unit 180 may start playback again when a playback command is applied to the playback-stopped virtual reality content. The playback command may be inputted in various ways.

For example, referring to (a) to (c) of FIG. 18, in the state where the playback of the virtual reality content is stopped, when the movement of the user corresponds to movement information indicated by the guide image 1810, the control unit 180 may play back the virtual reality content again from the playback-stopped time point. That is, a user may view the virtual reality space seamlessly by watching the virtual reality content in the same situation as the time point at which the playback of the virtual reality content is stopped.

On the other hand, although not shown in the drawing, even when the movement information of the user indicated by the guide image does not coincide with the currently detected movement of the user, based on the user's playback command, the control unit 180 may play back the virtual reality content. In this case, the control unit 180 may additionally provide dummy content instead of directly providing virtual reality content in order to reduce motion sickness. The dummy content may be notification information notifying that motion sickness can be caused. Therefore, a user may recognize that when the virtual reality content is played back, malfunction or motion sickness can occur.

In addition, as shown in (a) and (b) of FIG. 19, in the state where the movement information of the user indicated by the guide image 1810 does not match the currently detected movement of the user, when the playback command is applied, the control unit 180 may compare the currently detected movement information of the user with the movement information of the user stored at each playback time point of the virtual reality content, and play back the virtual reality content from the playback time point having the movement information of the user that is most similar to the movement information of the current user among the playback time points of the virtual reality content. Therefore, a user may minimize motion sickness by receiving the most suitable content of the virtual reality at the current position of the user.

As described above, even when the movement of a user is slowed down while the user checks an event that occurs during virtual reality experience, the electronic device according to an embodiment of the present invention plays back dummy content that allows the same experience feeling, so that even when the user returns directly to the virtual reality experience after confirming the event, motion sickness does not occur. In addition, as a delay section is provided when a user returns to the virtual reality space after confirming the event, this may allow the user to naturally adapt to the real content.

In addition, when the playback of the virtual reality content is stopped, the present invention detects the movement information of a user at the time of stopping playback and outputs a guide image indicating the movement information of the user in the virtual reality content, so that the user viewing the virtual reality content may view the virtual reality content again from the movement of the time point at which the playback of the virtual reality content is stopped. Through this, the present invention may reduce the gap between the virtual reality and the actual reality, thereby reducing user's motion sickness.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An electronic device comprising:
a main body;
a display configured to display a 3D screen corresponding to virtual reality content;
a controller configured to, when an event occurs from at least one application while the 3D screen is displayed, output notification information notifying about an event occurrence in correspondence to the 3D screen; and
a sensor configured to sense a degree of movement of a user when the notification information is output,
wherein the controller is configured such that:
when the degree of movement of the user sensed during the event satisfies a predetermined condition, the 3D screen is replaced with dummy content related to the 3D screen; and
the dummy content disappears when the event ends,
wherein when the degree of movement of the user is reduced to within a reference range during the event, the controller is configured to stop a playback of the 3D screen and play back dummy content corresponding to the 3D screen,
wherein when the event ends after the playback of the dummy content, the controller is configured to play back the 3D screen from a second time point that is earlier in time than a playback-stopped first time point, and
wherein when a predetermined input is received while a 3D screen is played back from the second time point after the playback of the dummy content is stopped, the controller is configured to perform a control to jump to the first time point and play back the 3D screen.

2. The electronic device of claim 1, wherein an interval between the first time point and the second time point is determined differently based on a content type of the 3D screen.

3. The electronic device of claim 1, wherein an interval between the first time point and the second time point is proportional to a playback time of the dummy content.

4. The electronic device of claim 3, wherein when the playback time of the dummy content exceeds a predetermined time range, additional information related to the 3D screen is provided while the 3D screen is played back again from the second time point to the first time point.

5. The electronic device of claim 1, wherein while the 3D screen is played back from the second time point after the playback of the dummy content is stopped, count information related to the first time point is output in a 3D screen being played back.

6. The electronic device of claim 1, wherein the controller obtains movement information of the user at a time point that the playback of the 3D screen is stopped, and provides a guide image indicating the obtained movement information on the 3D screen when the 3D screen is played back from the second time point according to the end of the event.

7. The electronic device of claim 6, wherein the guide image indicates at least one of a location and posture of the user, and a location and posture of the main body in virtual reality content corresponding to the 3D screen.

8. The electronic device of claim 6, wherein when the 3D screen reaches the first time point while the guide image is provided on the 3D screen, the guide image disappears.

9. The electronic device of claim 6, wherein:
the sensor senses whether the main body contacts a part of the body of the user; and
the controller causes the display to output a guide image to the virtual reality content when it is sensed that the main body contacts the part of the body of the user.

10. The electronic device of claim 6, wherein the guide image is output before a predetermined time before reaching the second time point after passing the first time point when the 3D screen is played back from the second time point.

11. The electronic device of claim 6, wherein when playback is performed from the first time point at which the playback of the 3D screen is stopped according to the end of the event, the controller is configured to output a guide image indicating information of a predetermined recommended movement.

12. The electronic device of claim 6, wherein when the movement information of the user corresponds to the guide information, the controller is configured to control to jump to the first time point to play back the 3D screen.

13. The electronic device of claim 6, further comprising a memory configured to store movement information of the user at each playback time point of virtual reality content, wherein:
when a 3D screen corresponding to the virtual reality content is played back according to the end of the event, the controller is configured to determine whether movement information of the user indicated by the guide image corresponds to current movement information of the user; and
when the movement information of the user indicated by the guide image does not correspond to the current movement information of the user, the controller is configured to set a playback time point of the virtual reality content based on the current movement information of the user.

14. The electronic device of claim 13, wherein when a predetermined time elapses, the controller allows the guide image to disappear on the display.

15. The electronic device of claim 1, wherein the controller is configured to:
generate a second layer different from a first layer where the 3D screen is played back,
play back the dummy content on the second layer in response to detecting that the movement of the user is reduced to the reference range during the event, and
maintain the first layer at a lower position than a position of the second layer while the dummy content is played back.

* * * * *